United States Patent
Sato

[19]

[11] Patent Number: 6,122,140
[45] Date of Patent: Sep. 19, 2000

[54] COVER OPENING AND CLOSING MECHANISM OF A RECORDING AND REPRODUCING APPARATUS

[75] Inventor: Yoshio Sato, Higashihiroshima, Japan

[73] Assignee: Sharp Kabushiki Kaisha, Osaka, Japan

[21] Appl. No.: 08/764,260

[22] Filed: Dec. 12, 1996

[30] Foreign Application Priority Data

Dec. 15, 1995 [JP] Japan ..................................... 7-327699
Aug. 7, 1996 [JP] Japan ..................................... 8-208609

[51] Int. Cl.[7] ................................................. G11B 33/02
[52] U.S. Cl. .................................... 360/99.02; 369/77.2
[58] Field of Search ........................ 360/93, 96.5, 99.06, 360/99.07, 99.02, 99.03; 369/77.1, 77.2

[56] References Cited

U.S. PATENT DOCUMENTS

| 4,768,113 | 8/1988 | Sato ....................................... 360/96.5 |
| 5,345,351 | 9/1994 | Krohn ................................... 360/96.5 |
| 5,351,228 | 9/1994 | Kanno et al. ........................... 369/77.2 |
| 5,408,459 | 4/1995 | Kawaguchi et al. ................. 360/99.06 |
| 5,430,587 | 7/1995 | Engan ..................................... 360/96.5 |
| 5,481,520 | 1/1996 | Tokoro ................................... 369/77.2 |

FOREIGN PATENT DOCUMENTS

| 03 84664A1 | 8/1990 | European Pat. Off. . |
| 04 75524A1 | 3/1992 | European Pat. Off. . |
| 06 33569A2 | 1/1995 | European Pat. Off. . |
| 4-315858 | 11/1992 | Japan . |

*Primary Examiner*—Brian E. Miller

[57] ABSTRACT

A cover is moved to an opened position or a closed position at a back side of an opening of a cabinet. A gap in which the cover can lie down is provided between an upper inner wall of the cabinet and a disk holder placed in an insertion completing position. A first guide groove and a second guide groove, in which a first guide pin and a second guide pin projected in a longitudinal direction from the cover slide, are respectively formed on cover retaining sections provided on both side surfaces of the cover. When each guide pin is guided along each guide groove, the cover draws a substantially arc-like trajectory along the inner wall of the cabinet and enters the gap from an upper end section of the cover. When the cover draws such a trajectory, an opening of a recording and reproducing apparatus into which a recording medium is inserted can be closed by the cover regardless of whether or not the recording medium has been inserted into the recording and reproducing apparatus. Furthermore, the cabinet of the recording and reproducing apparatus can be made compact.

16 Claims, 28 Drawing Sheets

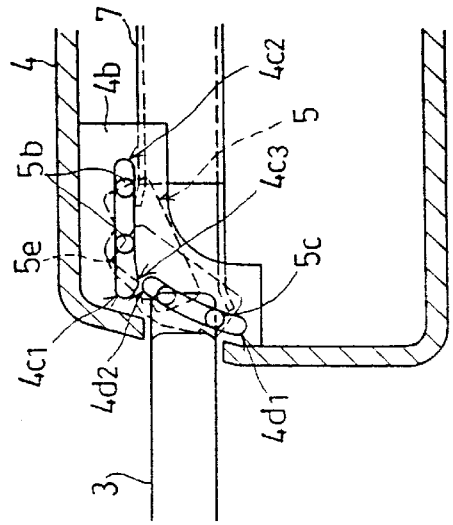
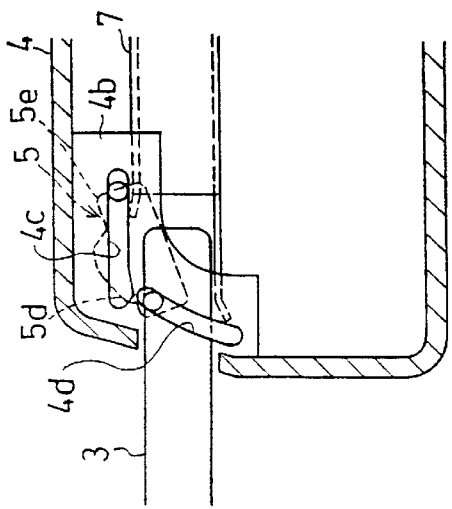
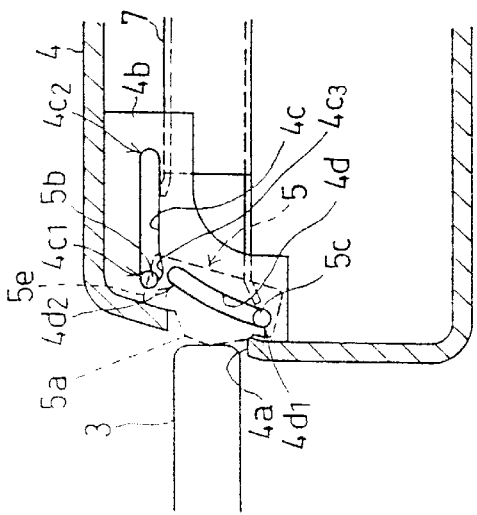
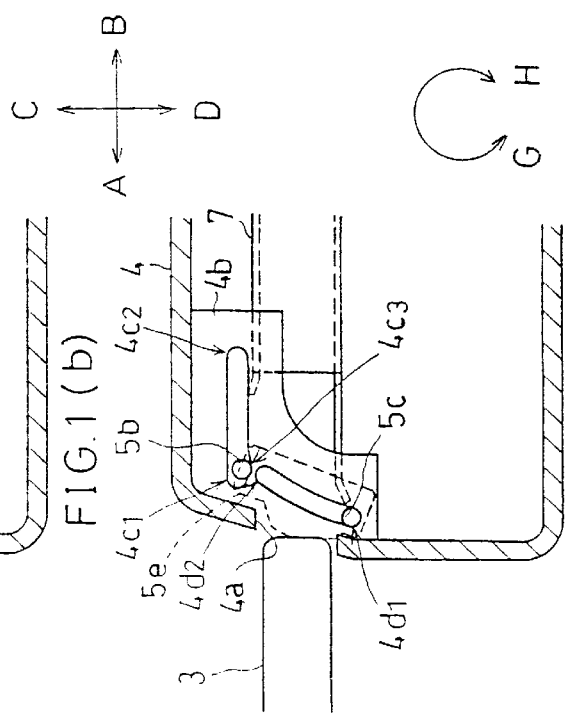

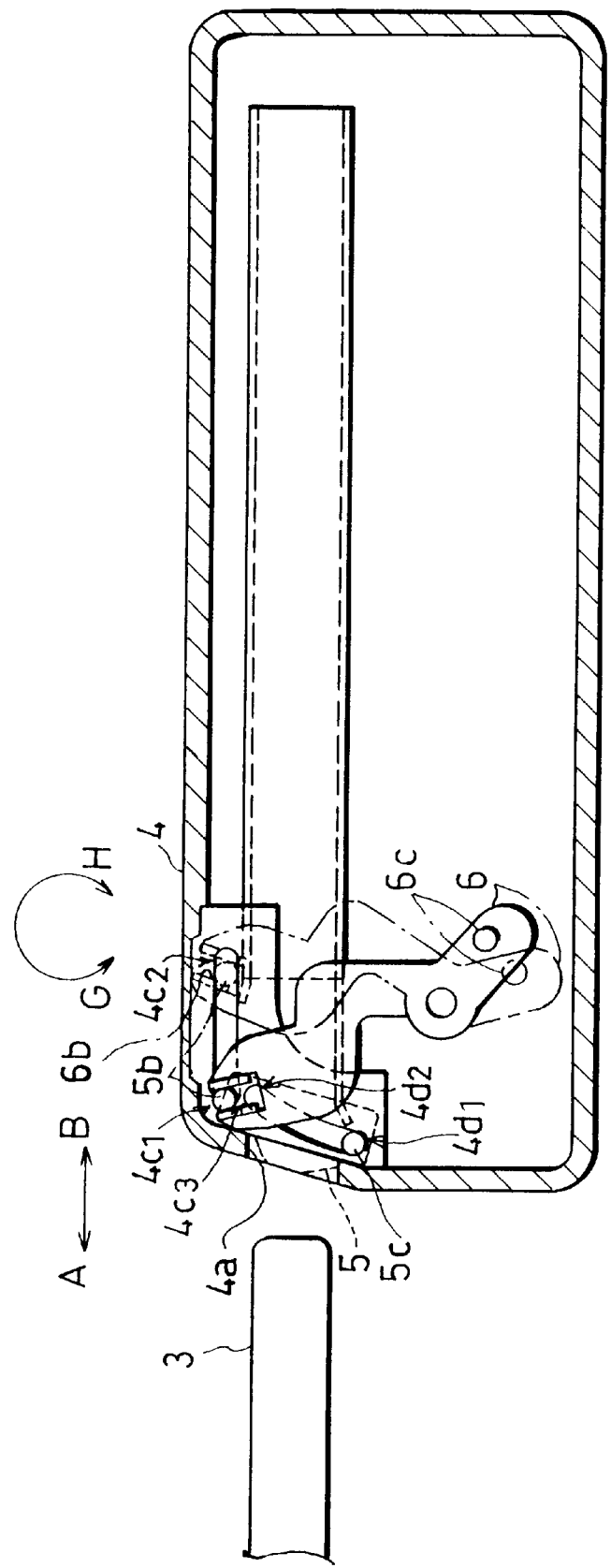

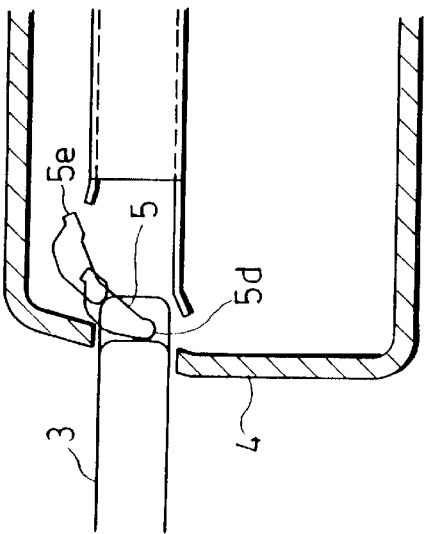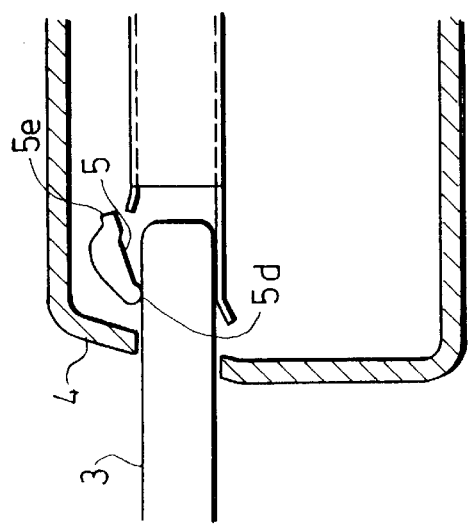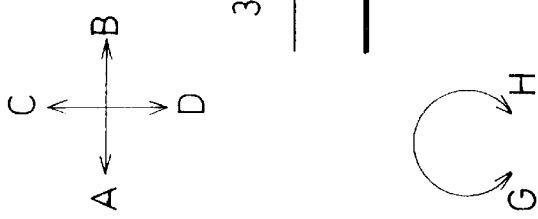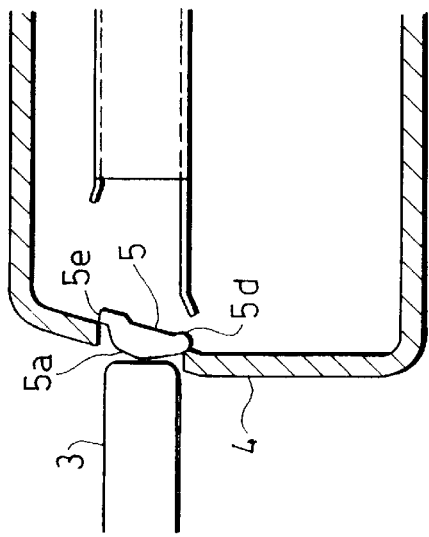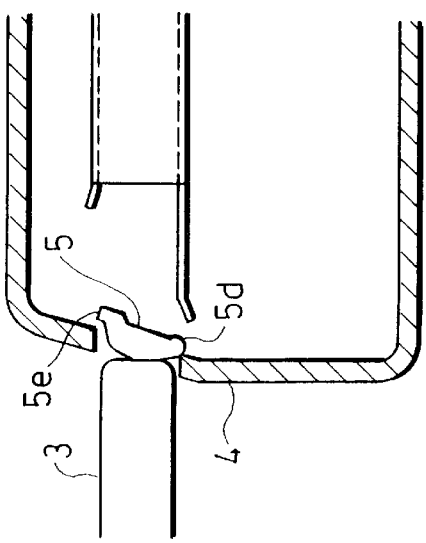

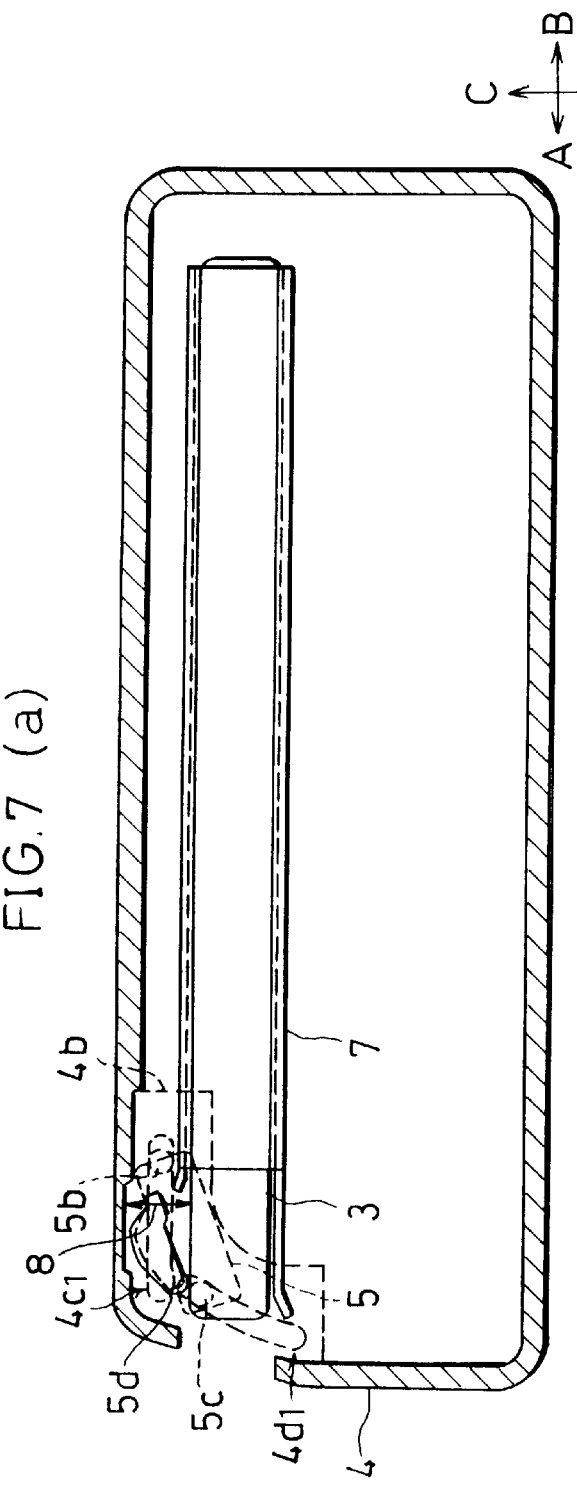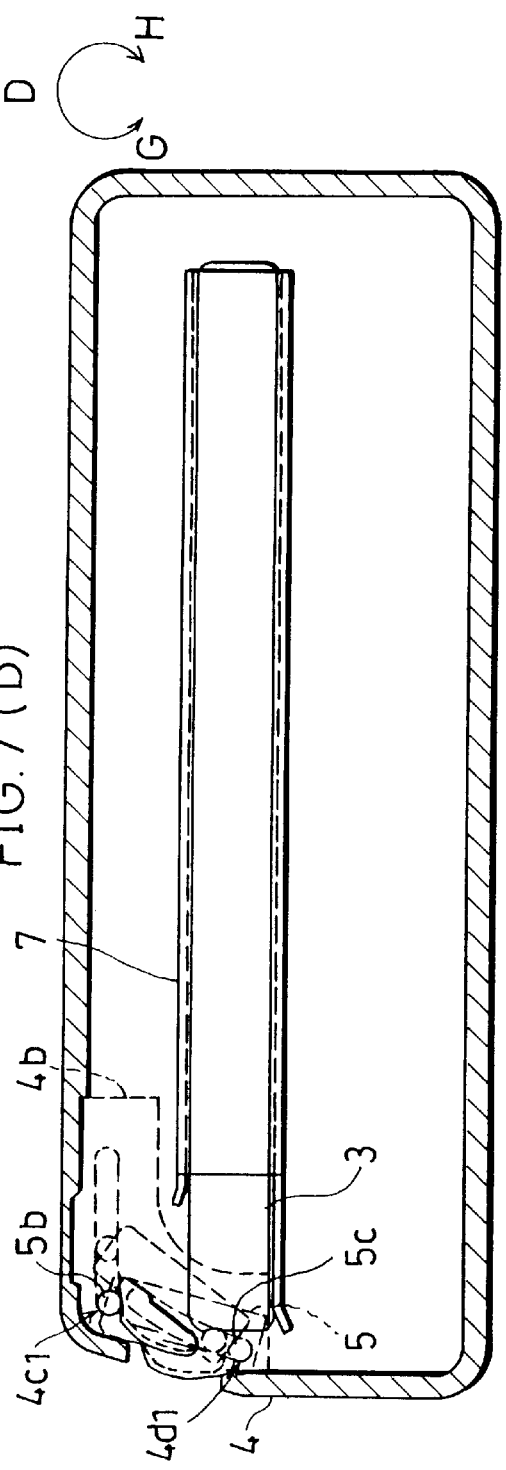

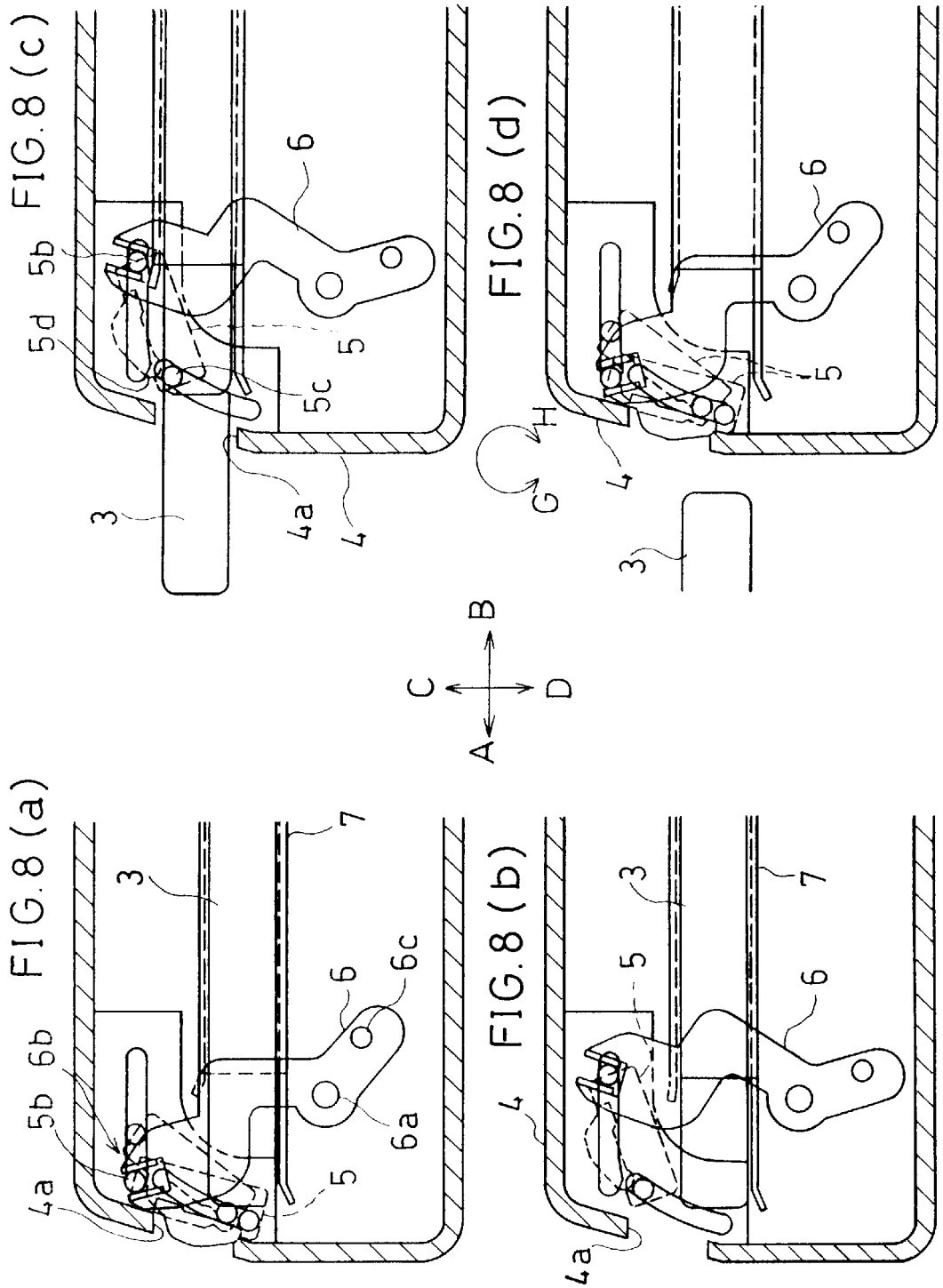

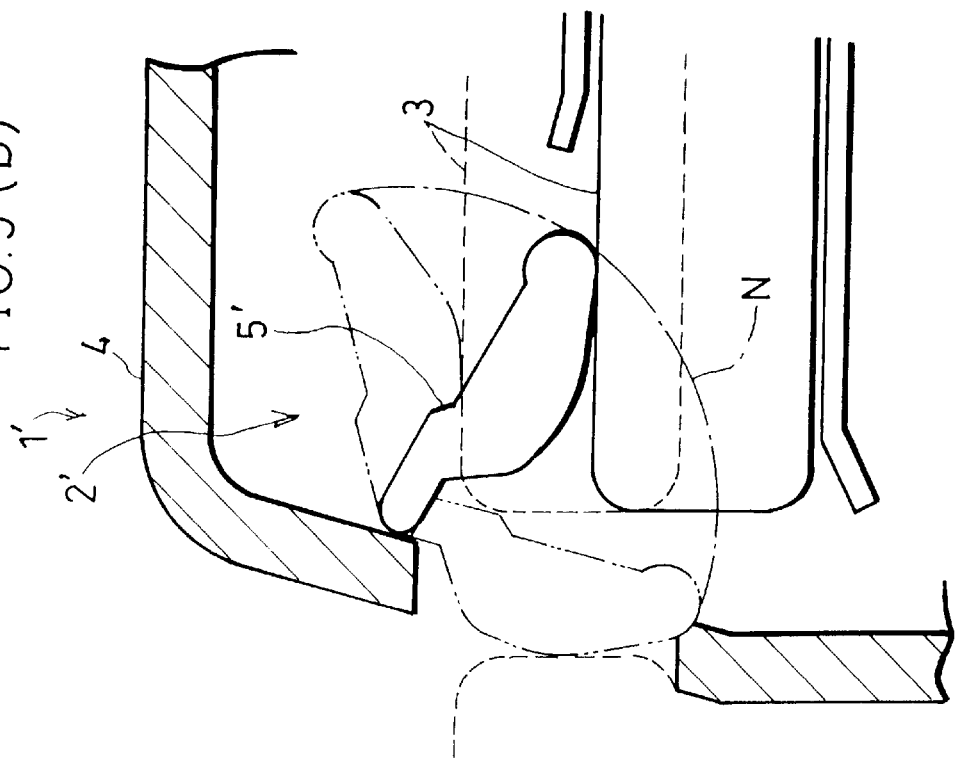
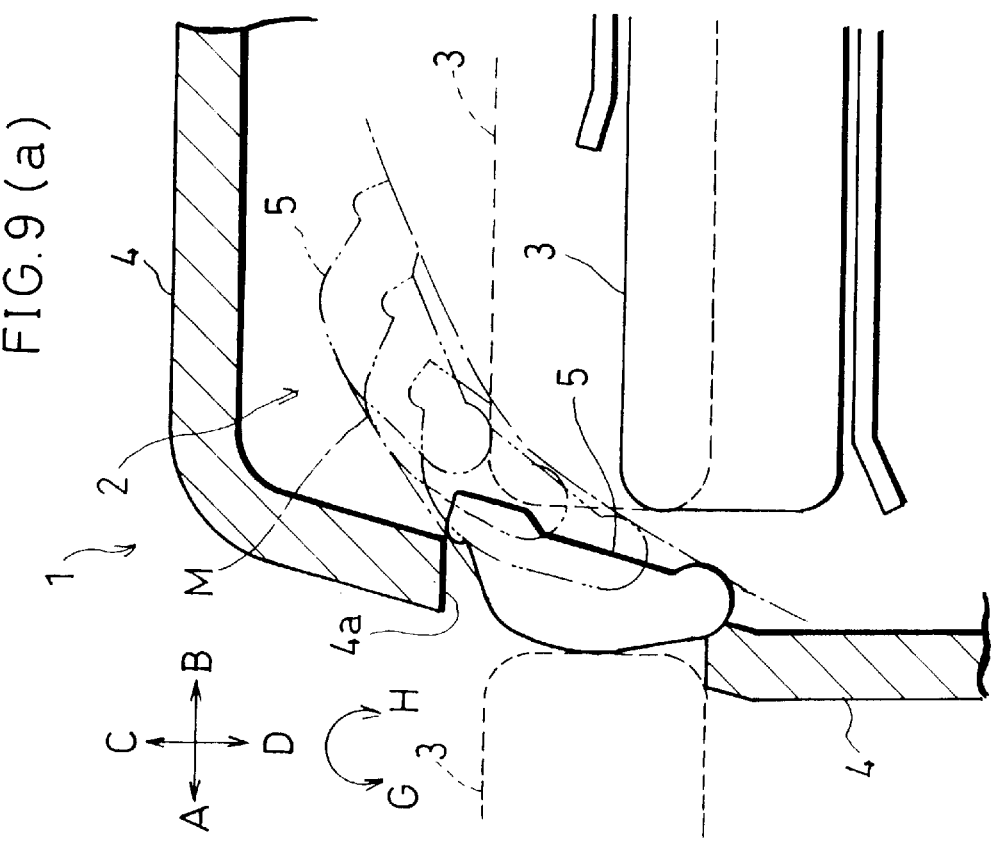

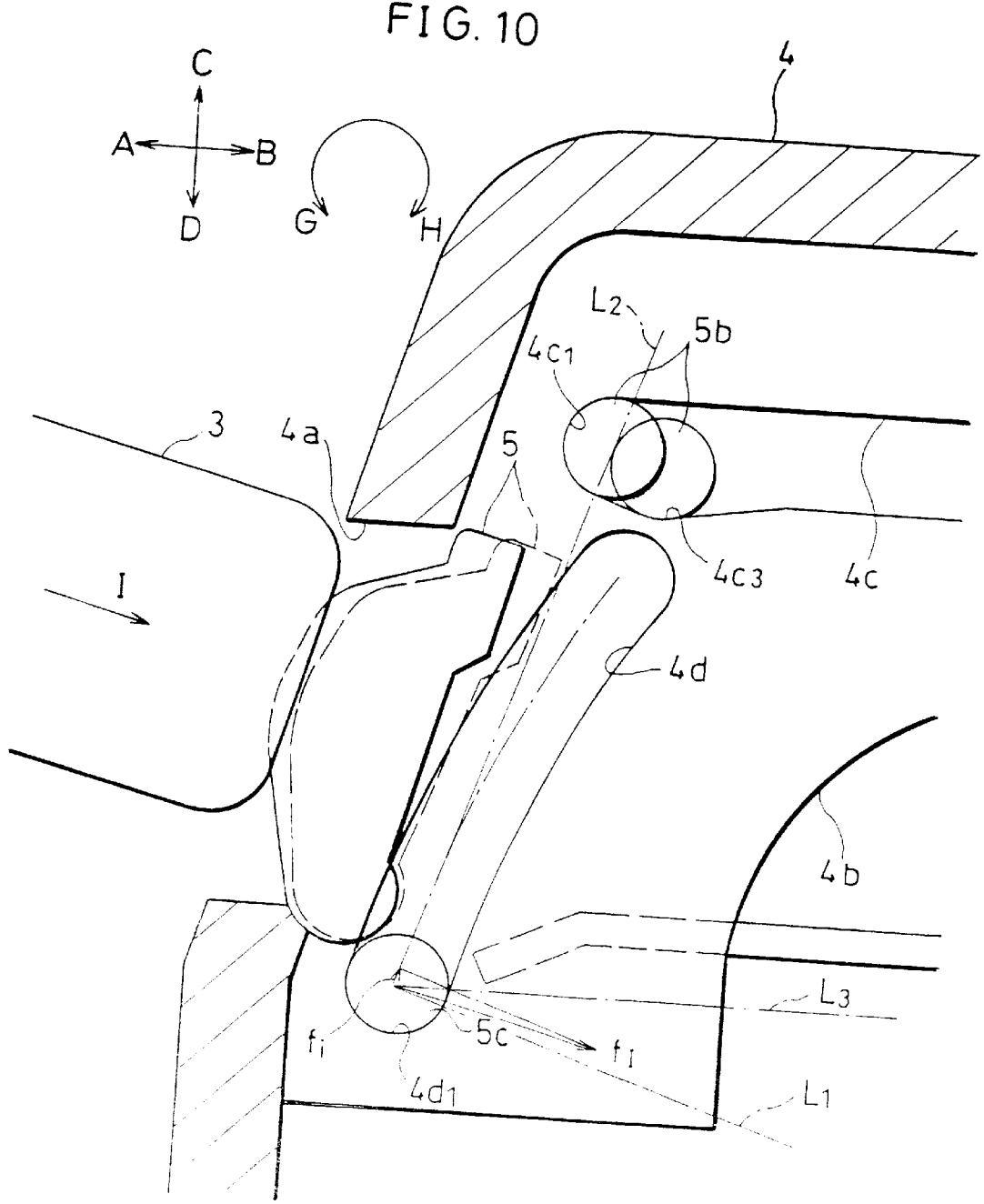

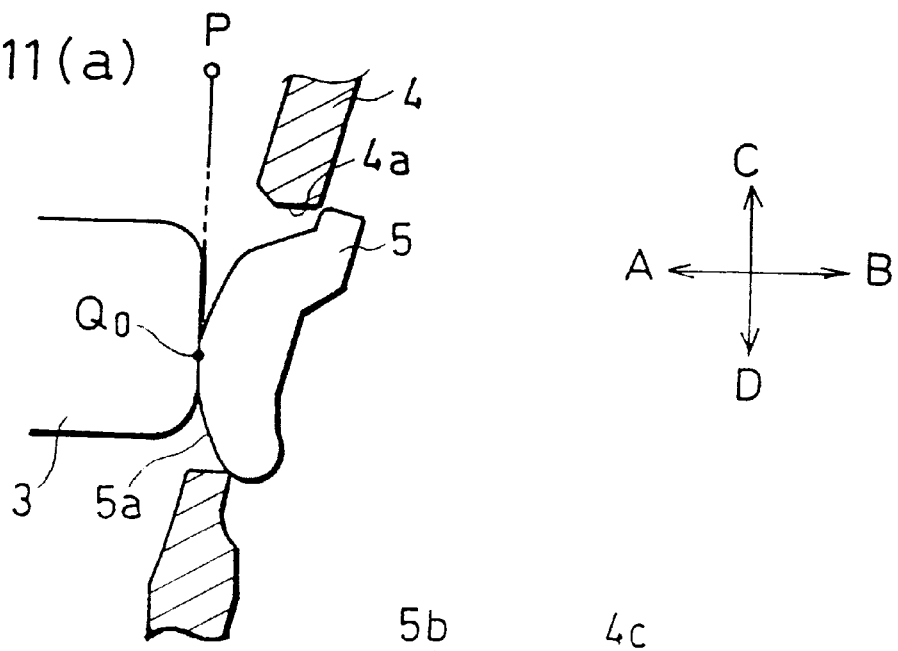
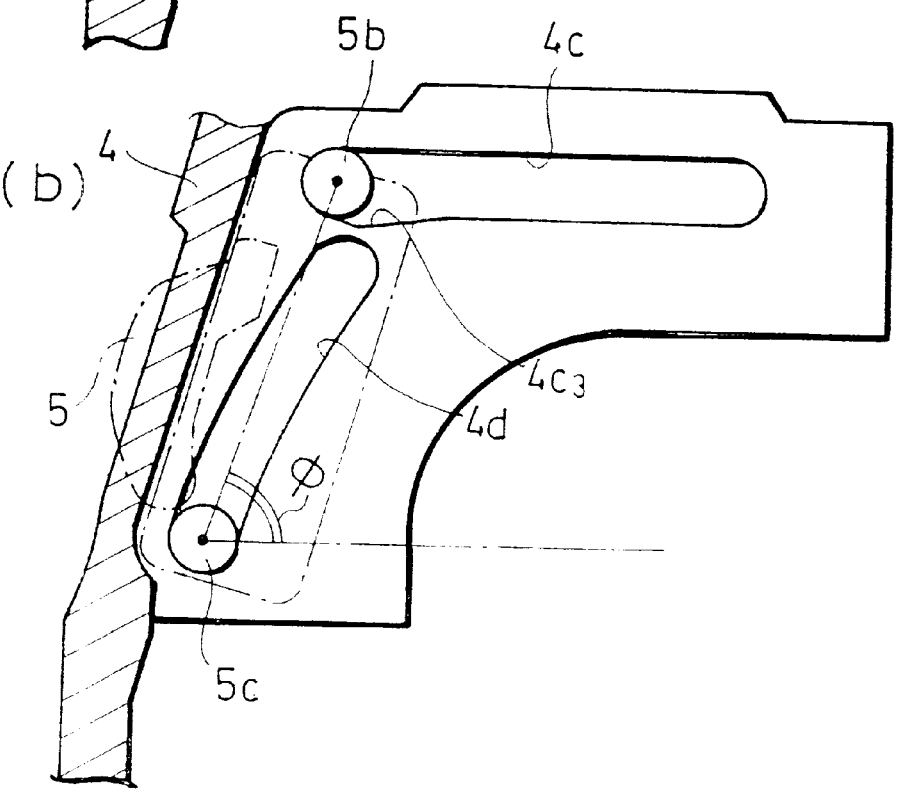

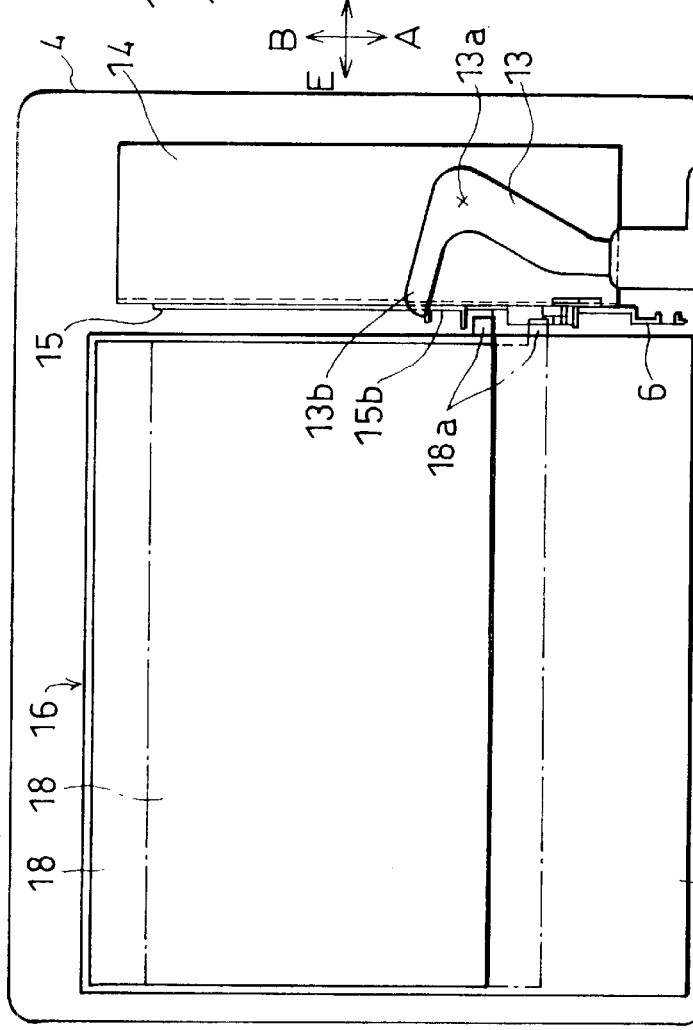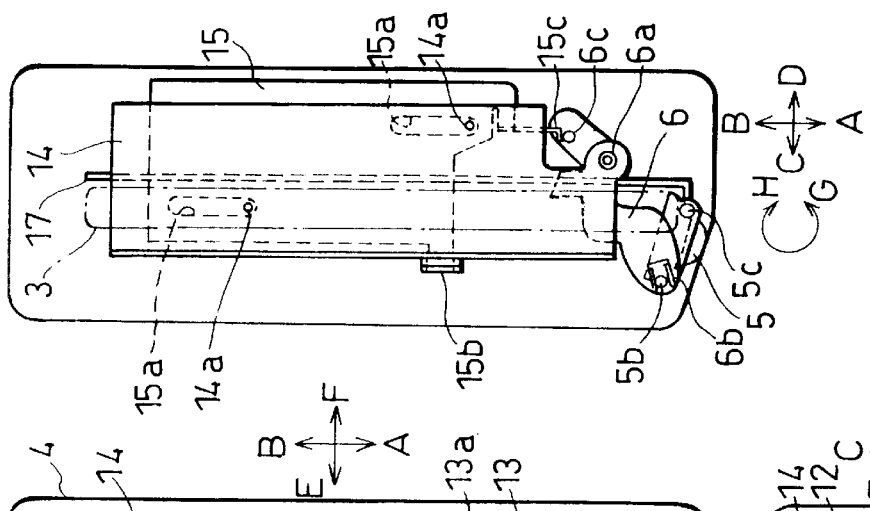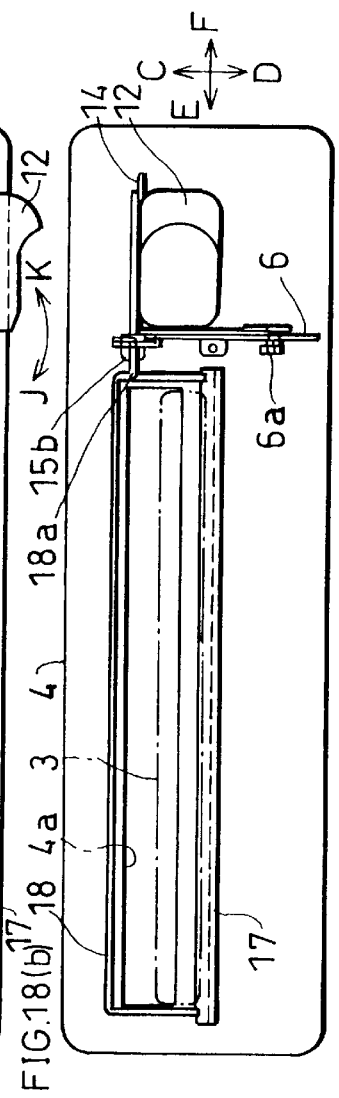
FIG.18(a)
FIG.18(b)
FIG.18(c)

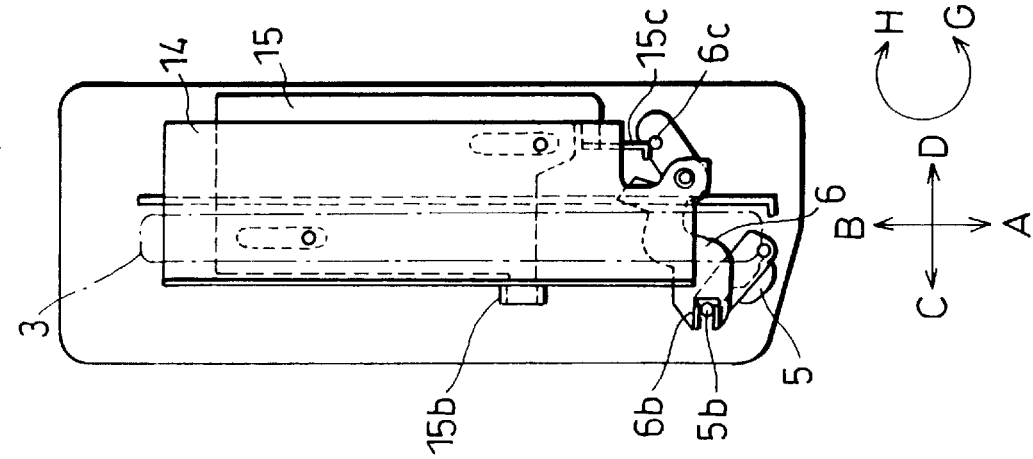
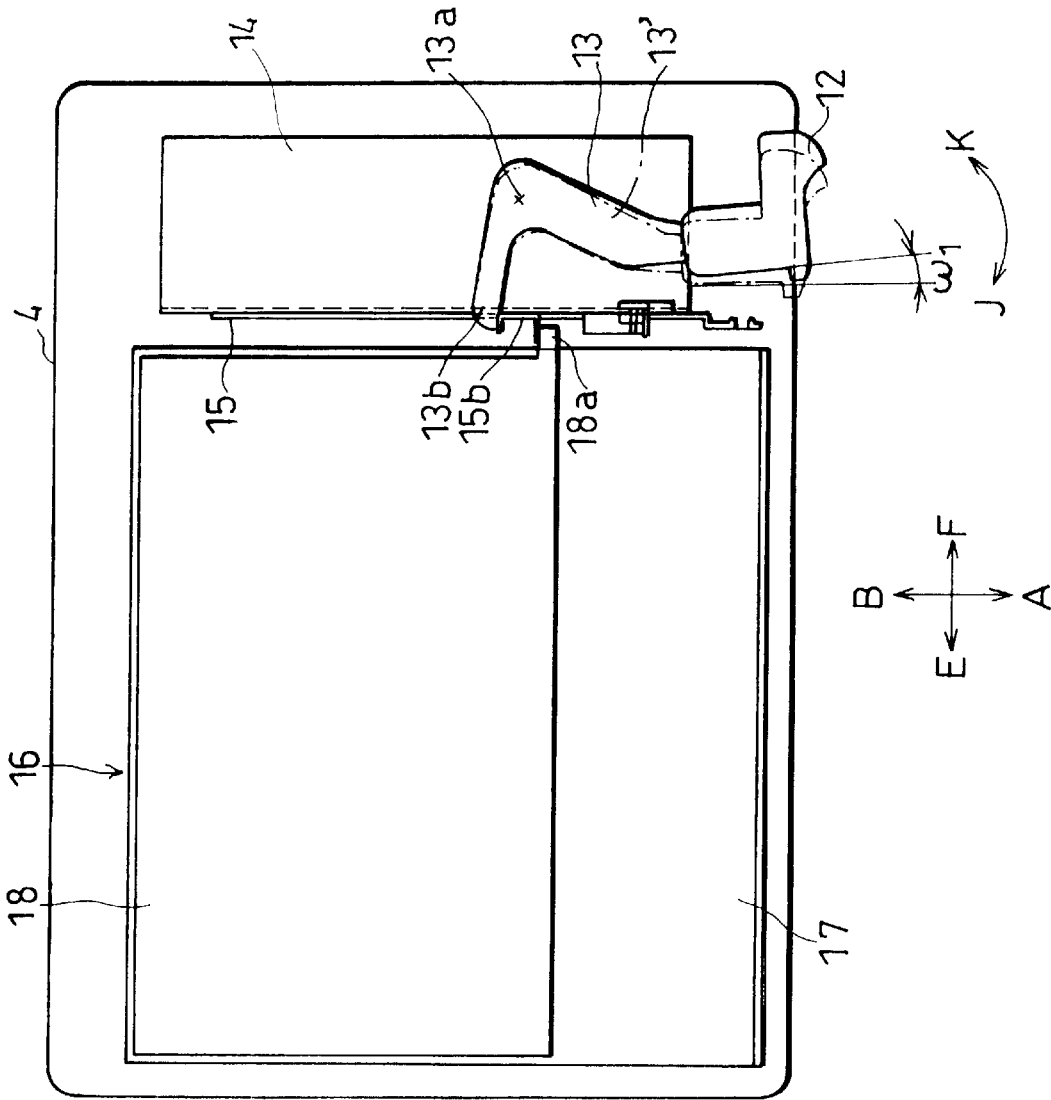

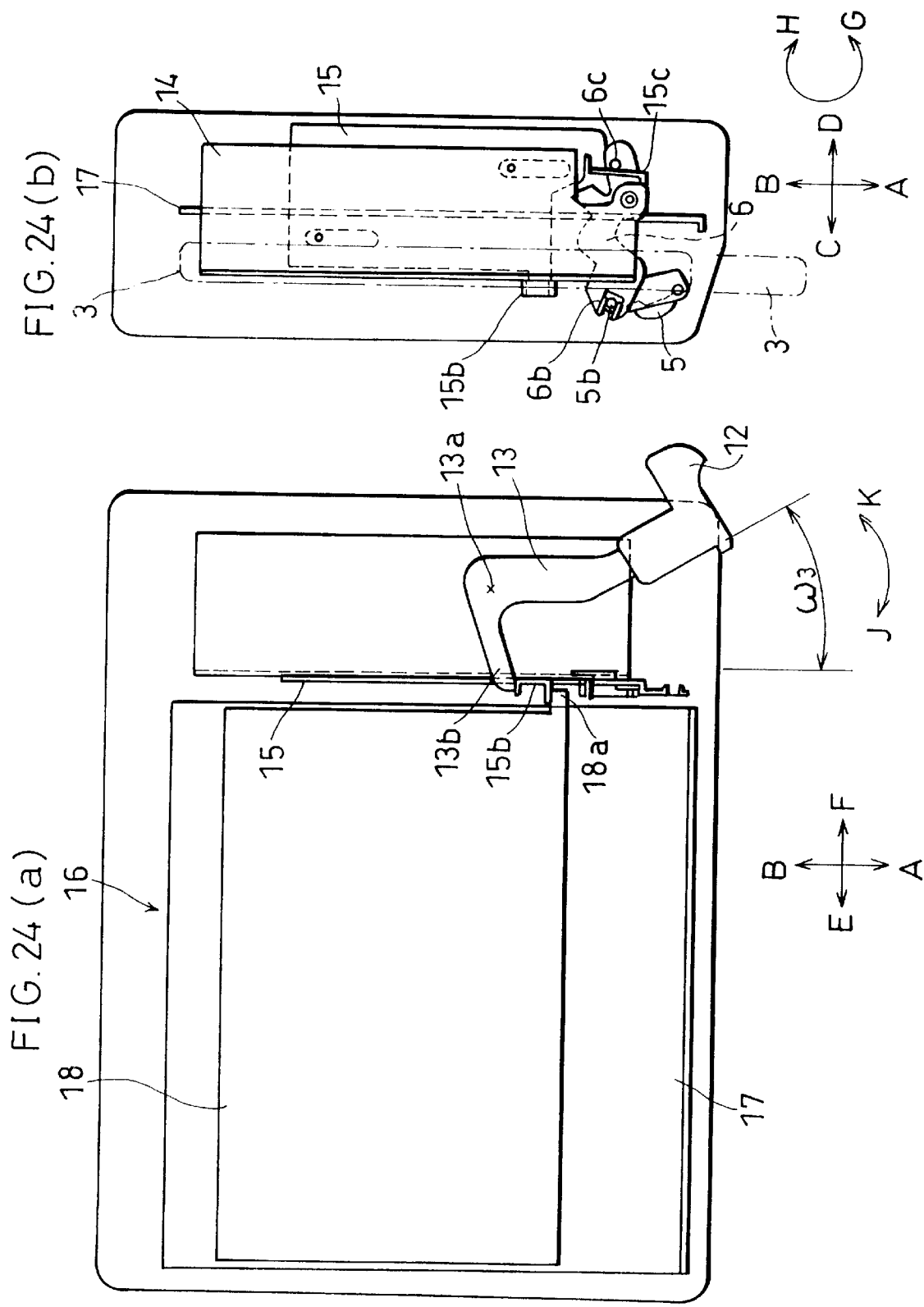

FIG.26(a)
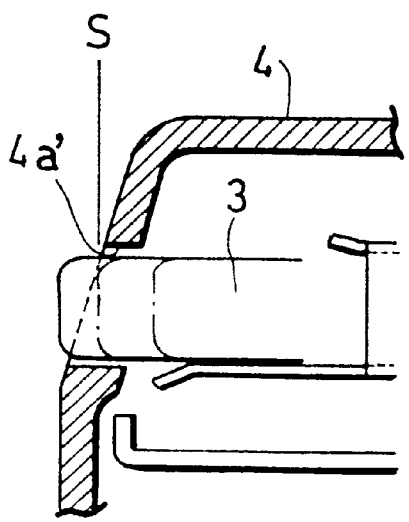
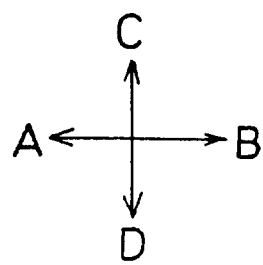
FIG.26(b)
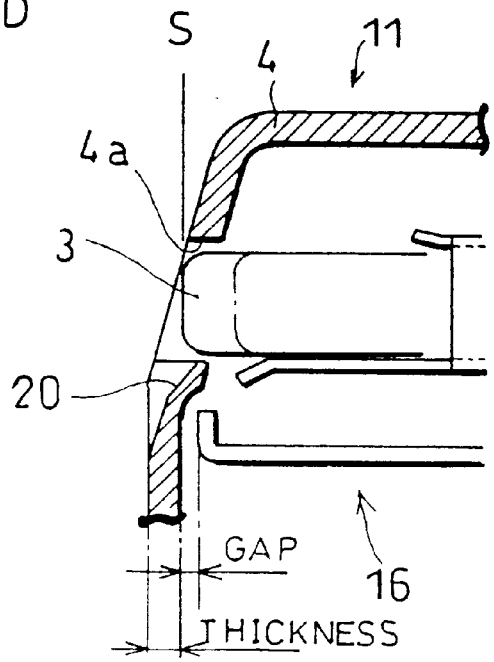
FIG.26(c)
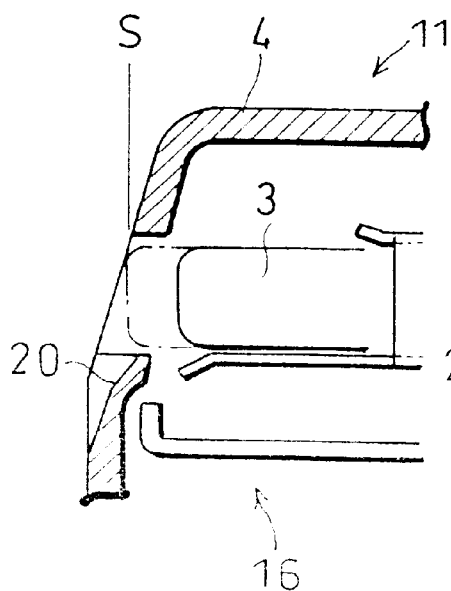
FIG.26(d)
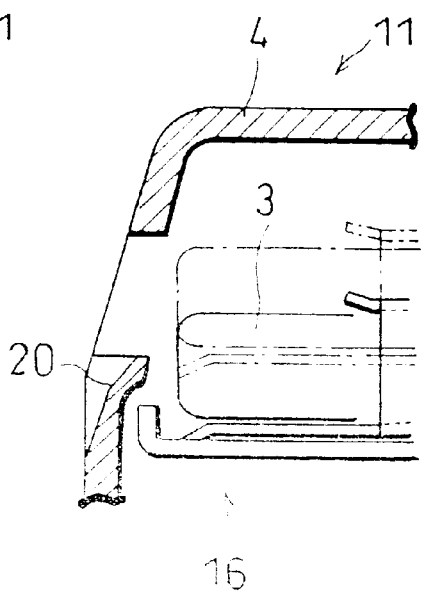

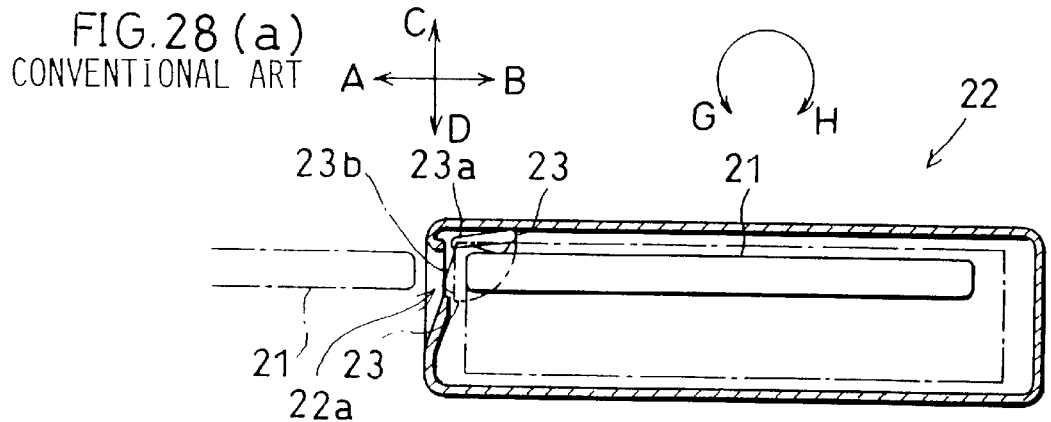
FIG.28(a) CONVENTIONAL ART
FIG.28(b) CONVENTIONAL ART
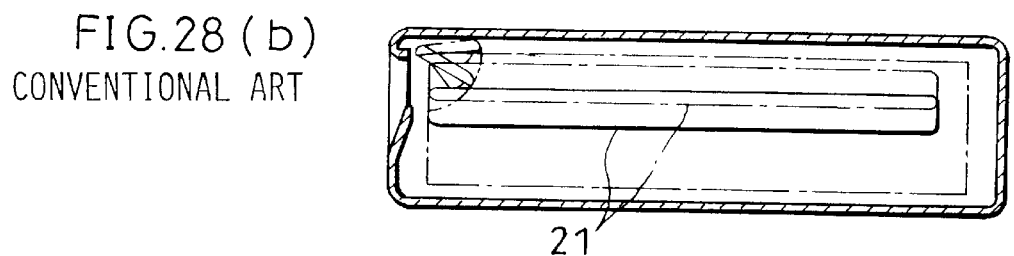
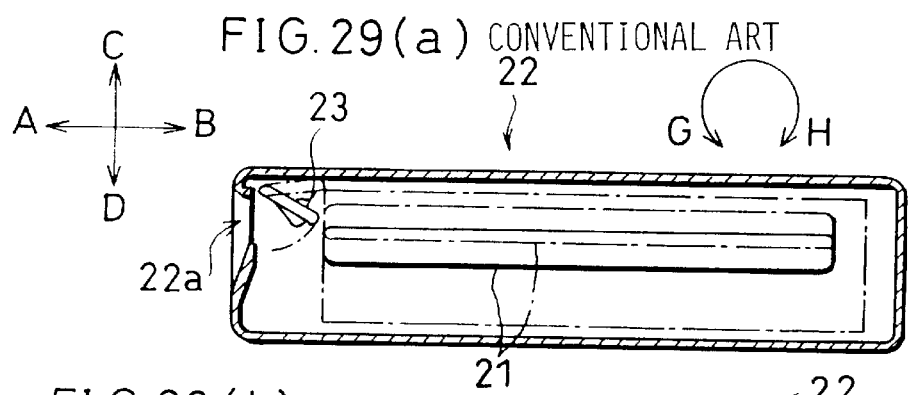
FIG.29(a) CONVENTIONAL ART
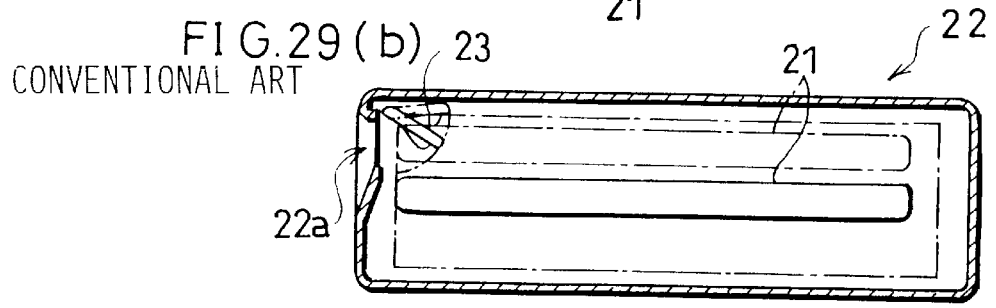
FIG.29(b) CONVENTIONAL ART

COVER OPENING AND CLOSING MECHANISM OF A RECORDING AND REPRODUCING APPARATUS

FIELD OF THE INVENTION

The present invention relates to a cover opening and closing mechanism which is provided to a recording and reproducing apparatus for recording and reproducing an information signal into and from a recording medium sheathed with a hard cartridge, such as MD (Mini Disk), 3.5-inch FD (Floppy Disk), MO disk (Magneto-Optical Disk). More specifically, the present invention relates to a cover opening and closing mechanism which makes a cover open or close an opening of the recording and reproducing apparatus, when the recording medium is attached into or ejected from the recording and reproducing apparatus through the opening.

BACKGROUND OF THE INVENTION

As shown in FIG. 27, for example, there exists a recording and reproducing apparatus 22 into which an MD 21 as a recording medium is inserted from the side of the front of the apparatus (direction of an arrow A) to a direction of an arrow B. Here, a side in the direction of the arrow A of the apparatus is referred to as a front-side section, a side in the direction of the arrow B as a backside section, a side in a direction of an arrow C as an upside section and a side in a direction of an arrow D as a downside section.

As shown in FIG. 28(a), conventionally, in the recording and reproducing apparatus 22, a cover 23 is provided to an opening 22a which is formed so that the MD 21 is inserted into the apparatus. The cover 23 can turn round an axis of turning 23a in a G-H direction in the upper section of the opening 22a, and a force is applied to the cover 23 in a direction of an arrow H by a spring, not shown, so that the cover 23 closes the opening 22a. As a result, the opening 22a is retained in the closed state shown by an alternate long and short dash line by the cover 23.

The description is given as to an operation of the cover 23. First, when the MD 21 is inserted in the direction B, the head of the MD 21 in an inserting direction is brought into contact with the cover 23. When the MD 21 is further inserted, the cover 23 is pressed by the MD 21 so as to start turning round the axis of turning 23a in a direction of an arrow G. Thereafter, when the MD 21 is inserted into the recording and reproducing apparatus 22 completely, an MD attaching mechanism, not shown, is operated, and the MD 21 moves downward so as to be attached to a recordable and reproducible position (FIG. 28b)).

At this time, the cover 23 is pressed by the applied force of the spring with it being in contact with the upper surface of the MD 21, and the opening 22a is in a half-opened state. A convex section 23b, whose projecting amount is larger downward, is formed on a front surface of the cover 23. When the MD 21 is inserted from the opening 22a, if the head of the MD 21 is brought into contact with a portion of the cover 23 which is near the axis of turning 23a, a force required for inserting the MD 21 should be strengthen. Therefore, the convex section 23b is provided in order to bring the head of the MD 21 into contact with a position of the cover 23 which is farthest from the axis of turning 23a.

In order to eject the MD 21, the MD attaching mechanism rises the MD 21 from the recordable and reproducible position in the direction C so that the cover 23 which is in contact with the MD 21 is turned in the direction G. When the MD 21 comes to such a height that the MD 21 can be ejected from the opening 22a, the rising is completed and the MD 21 slides in the direction A so that a portion of the MD 21 is ejected out of the apparatus. When an user takes out the MD 21, the cover 23 turns in the direction H by the applied force of the spring. Thereafter, the opening 22a is brought to the closed state.

When the MD 21 is not attached to the recording and reproducing apparatus 22, the inside of the apparatus is sealed, and thus dust, foreign materials, etc. are prevented from entering the apparatus.

However, in the above conventional arrangement, when the MD 21 is attached, the cover 23 is half opened, so that dust, foreign matters, etc. possibly enter the apparatus from the opening 22a.

Therefore, as shown in FIG. 29(a), it is considered that the recordable and reproducible position of the MD 21 is moved to the backward (the direction B) of the recording and reproducing apparatus 22 so that the MD 21 is brought to a position that the opening and closing operation of the cover 23 is not obstructed. In another way, as shown in FIG. 29(b), it is considered that the recordable and reproducible position is moved downward (the direction D).

However, in the former way, since the MD 21 should be further put into the inner part of the apparatus which exceeds a turning radius of the cover 23, a loading mechanism having a driving source such as a motor is additionally required for corresponding with a long inserting amount. Moreover, since it is necessary to at least enlarge the recording and reproducing apparatus 22 in the direction B, namely, its depth is enlarged, there arises a problem that a cost and a size of the recording and reproducing apparatus 22 are increased.

Meanwhile, in the latter way, since the MD 21 should be lowered to a position which exceeds the turning radius of the cover 23, it is necessary to at least enlarge the recording and reproducing apparatus 22 in the direction D, namely, its thickness is enlarged. For this reason, it is difficult to thin the recording and reproducing apparatus 22, and there arises a problem that a cost of the apparatus 22 is increased.

SUMMARY OF THE INVENTION

It is a first object of the present invention to provide a cover opening and closing mechanism, which is applied to a recording and reproducing apparatus using a hard cartridge type recording medium and is capable of closing an opening regardless of the case whether or not a recording medium is attached to the apparatus without enlarging the size of the apparatus by making it possible to move a cover, which opens and closes the opening used for inserting a hard cartridge therefrom, in a small space.

It is a second object of the present invention to provide a recording and reproducing apparatus which is thin and light and is capable of performing a series of unloading processes starting from the process of opening a cover which closes an opening of the apparatus by a sequential operation of linkage which is performed by one operation of an operating section, which is provided being exposed from a housing.

In order to achieve the above object, a cover opening and closing mechanism according to the present invention of a recording and reproducing apparatus in which an opening used for inserting a case containing a recording medium (for example, MD) therefrom is formed in a housing (for example a cabinet), and a cover which opens and closes the opening is provided to the opening on the inside of the housing, and the case which has been inserted into the housing is moved from an insertion completing position to a recordable and reproducible position, wherein a gap is provided between the case in the insertion completing position and the housing at the opposite side of the insertion completing position to the recordable a nd reproducible position. Moreover, the cover opening and closing mechanism has guiding means (for example, a guide pin formed projectingly on the cover, and a cover retaining section in which a guide groove on which the guide pin slides is formed, and a cover opening and closing lever) for letting the cover which comes in contact with the case inserted from the opening enter the gap with an end of the cover which is closer to the gap directing following the entering direction by a contact force generated by the insertion of the case.

In accordance with the above arrangement, for example, when a surface of the housing on which the opening is formed is set as a front surface, a surface which is bent from the front surface is set as an upper surface, the case is inserted from the opening with it intersecting the front surface so as to be brought to the insertion completing position. The gap is provided between the insertion completing position and the upper inner wall of the housing so as to have a predetermined interval which is slightly larger than the thickness of the cover.

In addition, the cover, which is provided to the opening section on the inside of the housing and closes the opening, has an end which is closer to the gap and another end which is farther from the gap. Namely, the closer end is a cover upper end which is closer to the upper surface of the housing, and the farther end is a cover lower end which is farther from the upper surface of the housing.

The conventional cover opening and closing mechanism is arranged so that an axis of turning is provided to the cover upper end so as to turn the cover lower end as a turning end, and thus the cover is guided to the gap. The cover opening and closing mechanism of the present invention is not a conventional turning-round-axis type, but includes guiding means for letting the cover enter the gap from the cover end which is closer to the gap, i.e. the cover upper end. Therefore, in order to open the opening, since the cover may be moved along the upper inner wall from the opening on the inside of the housing, it is enough to provide a gap for about the thickness of the cover between the housing and the insertion completing position. Namely, compared with the conventional moving domain which is determined by a radius of turning of the cover, the moving domain of the present invention which is determined according to the thickness of the cover becomes smaller.

As a result, compared with the conventional cover opening and closing mechanism, the housing can be minimized or thinned.

The above cover opening and closing mechanism may have force applying means (for example, a spring) for reversing the cover along the entering trajectory of the cover so as to bring the opening into the closed state in conjunction with movement of the case from the insertion completing position to the recordable and reproducible position.

Since the recordable and reproducible position is normally located in the vicinity of the center of the housing with respect to the insertion completing position, if the case is moved from the insertion completing position to the recordable and reproducible position, the case gets distant from the opening. As a result, a sufficient space for returning the cover is produced at the opening on the inside of the housing. However, compared with the conventional turning-round-axis type cover, since the cover of the present invention draws a moving trajectory along the upper inner wall from the opening on the inside of the housing, even if a distance between the insertion completing position and the recordable and reproducible position is shorter than the conventional one, when the cover is reversed by the force applying means, the interference of the cover with the case can be prevented.

Therefore, when the force applying means is provided, the recording and reproducing apparatus can be minimized and thinned, and furthermore, the opening is always maintained in the closed state regardless of the case whether the case is attached or not. As a result, the cover opening and closing mechanism, which sufficiently protects the recording and reproducing apparatus against entering of dust and foreign matters, can be provided.

In addition, the cover opening and closing mechanism may be arranged so that the entering trajectory of the cover is a substantially arc from a back side of the opening along an inner wall of the housing.

As mention ed above, in the arrangement that the case is made to enter the gap from the cover end which is closer to the gap, the moving domain in the above arrangement can be smaller than the moving domain of the turning-round-axis type cover can be minimize, but various moving trajectories can be considered. In these trajectories, an entering trajectory, which can make the moving domain of the cover to minimize smallest, is a substantially arc-like entering trajectory from the back side of the opening along the inner wall of the housing.

Therefore, the recording and reproducing apparatus can be smallest or thinnest by setting the entering trajectory so as to have a substantially arc-like shape.

In addition, the guiding means may have first guide pins and second guide pins formed on each side of both ends of the cover in the longitudinal direction so as to be protruded parallel with the longitudinal direction; and a pair of cover retaining sections provided to the housing so as to face each other, guide grooves for guiding movement of the cover by means of the first and second guide pins fitted in the guide grooves being respectively formed in the cover retaining sections. In the guide grooves, the first guide grooves corresponding to the first guide pins are formed substantially parallel with the inserting direction of the case on the side which is closer to the gap than the second guide grooves corresponding to the second guide pins, whereas the second guide grooves may be formed so that one of the second guide pins relatively turns round one of the first guide pins when the case enters the gap.

In accordance with the above arrangement, since the first guide grooves corresponding to the first guide pins are closer to the gap than the second guide grooves corresponding to the second guide pins, the first guide grooves mainly guide the upper end of the cover, and the second guide grooves mainly guide the lower end of the cover. Moreover, since the first guide grooves are formed substantially parallel with the inserting direction of the case, when the first guide pins respectively formed on both the ends of the cover in the longitudinal direction slide on the first guide grooves, the upper end of the cover moves substantially parallel with the inserting direction of the case so as to be put into the gap.

Meanwhile, since the second guide grooves are formed so that the second guide pins relatively turn round the first guide pins respectively, the lower end of the cover enters the gap following the back side of the upper end of the cover so as to draw a substantially arc-like trajectory from the back side of the opening along the inner wall of the housing. When the upper end and the lower end of the cover are guided to the gap as mentioned above, the cover moves so as to draw the substantially arc-like entering trajectory.

In addition, when the force applying means is provided, each guide pin reverses along each guide groove, and the cover is reversed along the entering trajectory so that the opening can be closed.

As mentioned above, in accordance with such a simple arrangement that the guide pins are provided to each side surface of both ends of the cover in the longitudinal direction projectingly and the guide groves for respectively guiding the movement of the guide pins are formed on the cover retaining sections correspondingly to the guide pins, the cover can be moved between the opening and the gap so as to draw the substantially arc-like trajectory which makes the moving domain of the cover smallest.

Furthermore, the cover opening and closing mechanism may be arranged so that each width of end portions of the first guide grooves in the vicinity of the opening is partially widened so that the first guide pin can move to the inside of the housing further than a movement starting direction of the second guide pins in the second guide grooves at the start of inserting the case.

If the first guide pins, which are allowed to move substantially parallel with the inserting direction of the case, are located in the movement starting direction of the second guide pins which are allowed to move in a different direction from the moving direction of the first guide pins, the first guide pins receive a force which presses the first guide pins towards the movement starting direction of the second guide pins. As a result, the first guide pins hardly start moving along the first guide groove smoothly.

In addition, when the first guide pins are placed in the outside of the housing further than the movement starting direction of the second guide pins, there arises the trouble that only the first guide pin should be moved along the first guide groove in the inserting direction of the case with the second guide pin stopped.

Therefore, as mentioned above, when each width of the end portions of the first guide grooves is partially widened on the side end portion of the vicinity of the opening so that the first guide pins can be moved to the more inner side of the housing than the movement starting direction of the second guide pins, the first guide pin can be moved quickly to the more inner side of the housing with respect to the movement starting direction of the second guide pin by the contact force of the case applied to the cover. As a result, the cover is provided with a moment which makes the second guide pins turn round the first guide pin in the direction where the second guide pins reach the gap.

In addition, when the first guide pins move to the more inner side of the housing with respect to the movement starting direction of the second guide pins, the cover is brought into a state that it lies down further in the inserting direction of the case compared with the case where the first guide grooves are not partially widened. As a result, a component of force for turning the second guide pins which is derived from the contact force of the case becomes strong. Namely, since the cover can be moved to the opened position more easily, the cover starts to enter the gap smoothly, and a limit of the inserting direction of the case is eased. As a result, an operator can insert the case more easily.

In other words, even if the case which comes in contact with the cover is brought into a position where it has a slight inclination in the direction the opening is closed, the component of force for moving the cover to the opened position is easily derived from the contact force. For this reason, the operator can insert the case without paying attention to a contacting angle of the case with the cover very much.

Furthermore, the cover opening and closing mechanism may be arranged so that when a place where the opening of the housing is provided is a front section and the gap is determined in an upper section of the housing, a concave section, which is continuous with a forward end of one of the first guide grooves, is formed on a sliding surface on a lower section of the forward end of the first guide groove, and a depth of the concave section is determined so that a distance between the concave section and a lower end of one of the second guide grooves becomes equal to a distance between the forward end and the lower end.

In accordance with the above arrangement, since the distance between the concave section of one of the first guide grooves and the lower end of one of the second guide grooves is set so as to be equal with the distance between the front end of one of the first guide grooves and the lower end of one of the second guide grooves, the first guide pins respectively draw an arc round the second guide pins on the lower ends of the second guide grooves so as to slide from the front end of the first guide groove to the concave section by the contact force of the case applied to the cover. Its function was described above according to the arrangement that the width of the first guide groove is partially widened.

In addition, the convex section which comes in contact with the inserted case is formed on the surface of the cover which faces the outside of the housing from the opening, and the convex section may have a such a configuration that according to the insertion of the case, the component of force, which directs the moving direction of the cover which changes along the entering trajectory, is generated from the contact force applied from the case to the convex section. Since the cover of the present invention moves while drawing a substantially arc-like entering trajectory according to the insertion of the case, although the inserting direction of the case is one direction, both the moving direction of the cover and the contact point of the case with the convex section vary successively. In this case, when the configuration of the convex section is set so that the contact force, which always generates a component of force in the moving direction of the cover, is applied from the case to the convex section, the cover can be moved within the gap along the substantially arc-like entering trajectory by utilizing the contact force having one direction which the cover receives from the case to be inserted in one direction from the opening.

More specifically, when the configuration of the convex section is set so that the direction of the contact force which the convex section receives from the case does not become vertical to the moving direction of the cover and has make an acute angle to the moving direction of the cover, the component of force directing the moving direction of the cover can be generated from the contact force.

Furthermore, the cover opening and closing mechanism may have an ejection switch (for example, a turning hook) for ejecting the case from the opening out of the housing by means of a moving stroke of an operating section (for example, an ejection handle) operated by an operator, the operating section being provided so as to be exposed from the housing; and transmitting means (for example, an ejection plate and a rod) for transmitting the moving stroke of the operating section to the cover so as to let the cover enter the gap while retaining the case in the recordable and reproducible position when a first moving stroke which is a part of the moving stroke is given to the operating section from an initial position of the operating section in the case where the case is in the recordable and reproducible position, and for so as to hold the position of the cover in the gap when a second moving stroke is given to the operating section so that the case is ejected from the recordable and reproducible position.

In accordance with the above arrangement, in the case where the case in the recordable and reproducible position is desired to be ejected out of the housing, when a first moving stroke is given to the operating section, the transmitting means transmits the first moving stroke to only the cover so that the cover is brought to the opened position. As a result, since the cover is brought from the opening to the gap, the cover does not prevent the case from moving from the recordable and reproducible position to the insertion completing position which is very close to the opening. Namely, prior to the ejection of the case, the opening can be previously opened.

In addition, when a second moving stroke is given to the operating section so that the case is ejected from the recordable and reproducible position, the transmitting means transmits the second moving stroke to the cover, but at this time, a location of the cover is not changed in the gap. Therefore, a space used for further moving the cover within the gap is not required, and an excessive load due to the second moving stroke is not applied to the cover.

As a result, the function in opening the opening prior to the ejection of the case can be given to the cover opening and closing mechanism so as to be linked to the operation of the operating section of the ejection switch.

Furthermore, the guiding means may have an arrangement that the guiding means, being connected to said cover, moves the cover in the opened or closed position along the entering trajectory of the cover, and includes a driving member (for example, a cover open/close lever) to which an energizing force is applied so as to move the cover to a direction of the closed-position, and that the transmitting means is a sliding member (for example, rod) which moves in contact with the driving member and may have a first sliding surface (for example, rising section) and a second sliding surface (for example, substantially flat section), the first sliding surface applying a contact force, which moves the cover to the opened position, to the driving member when the first moving stroke is given to the operating section, the second sliding surface applying a force, which substantially balances with the energizing force applied to the driving member, to the driving member when the second moving stroke is given to the operating section.

In accordance with the above arrangement, when the first moving stroke is given to the operating section, the first sliding surface of the sliding member comes in contact with the driving member to which a force is applied in the direction where the cover is brought to the closed position so that the driving member is moved to the opened direction in opposition to the applied force. Namely, the sliding member applies the contact force to the driving member through the first sliding surface. At this time, the driving member slides from the first sliding surface to the second sliding surface.

Meanwhile, when the second moving stroke in addition to the first moving stroke is applied to the operating section, a force which acts between the driving member and the second sliding surface has such a strength balances with the force applied to the driving member. As a result, while the driving member is sliding on the second sliding surface, the forces applied to the driving member are balanced.

Therefore, the driving member retains the cover in the opened position.

As mentioned above, in the simple arrangement having the sliding member which slides with respect to the driving member with two kinds of sliding surfaces, a moving amount of the driving member and strength of the force transmitted to the driving member can be varied, and the effects by the above arrangement can be obtained.

In order to achieve the above second object, a recording and reproducing apparatus of the present invention, in which an opening used for inserting a case containing a recording medium (for example, MD) therein is formed in a housing (for example, a cabinet) and a cover for opening and closing the opening is provided to the opening on the inside of the housing, and the case which has been inserted into the housing is moved from an insertion completing position to a recordable and reproducible position, has a cover opening and closing mechanism in which a gap is provided between the case in the insertion completing position and the housing at the opposite side of the insertion completing position to the recordable and reproducible position, the cover opening and closing mechanism having guiding means (for example, a cover retaining section in which a guide groove is formed and a cover open/close lever) for letting the cover, which comes in contact with the case inserted from the opening, enter the gap from a side end of the cover closer to the gap by a contact force generated by the insertion of the case; a medium attaching and detaching mechanism for moving forward and backward the case between the opening and the insertion completing position, and for moving the case between the insertion completing position and the recordable and reproducible position; and an engaging member for when the case is in the recordable and reproducible position, letting the cover opening and closing mechanism to move the cover to the opened-position with the engaging member engaged with the cover opening and closing mechanism according to a moving stroke of an operating section (for example, ejection handle) operated by an operator, and letting the medium attaching and detaching mechanism to exposed the case with the engaging member (for example, ejection plate) engaged with the medium attaching and detaching mechanism, the engaging member being connected to the operating section provided to be extruded from the housing.

In accordance with the above arrangement, the cover opening and closing mechanism for opening and closing the cover, the medium attaching and detaching mechanism for attaching to or detaching from a recording and reproducing apparatus, and the operating section operated by an operator are linked to one another by means of the engaging member so that the case in the recordable and reproducible position can be ejected out of the housing. Namely, this linkage makes it possible that a series of the unloading operation can be performed by only one operation of the operating section. The series of the unloading operations includes the step of opening the opening, the step of moving the case from the recordable and reproducible position to the insertion completing position, and the step of ejecting the case out of the housing from the insertion completing position through the opening.

As a result, it is not necessary to provide a special driving source for performing the cover opening and closing operation of the cover opening and closing mechanism and performing the case attaching and detaching operation of the medium attaching and detaching mechanism. Moreover, it is not necessary to particularly provide a transmitting mechanism for transmitting the driving force of the driving source to the cover opening and closing mechanism and the medium attaching and detaching mechanism. Therefore, since the driving source and the transmitting mechanism does not have to be provided, the recording and reproducing apparatus can be small, thin or lightweight. Namely, the effects obtained by the cover opening and closing mechanism of the present invention can be further improved.

The recording and reproducing apparatus may have an arrangement t hat a gap between the engaging member and the medium attaching and detaching mechanism is determined so that the engaging member is engaged with the medium attaching and detaching mechanism later than the engagement of the engaging member with the cover opening and closing mechanism when the operating section is operated by an operator.

In accordance with the above arrangement, since the engaging member is engaged with the medium attaching and detaching mechanism later than the engagement of the engaging member with the cover opening and closing mechanism, the attaching and detaching operation of the case by the medium attaching and detaching mechanism is performed later than the cover opening and closing operation by means of the cover opening and closing mechanism. Namely, first, the cover moves in the opened direction with the case retained in the recordable and reproducible position so as to be separated from the opening and brought to the gap. As a result, when the case moves from the recordable and reproducible position to the insertion completing position which is very close to the opening, the movement of the case is not prevented by the cover.

When the case is in the recordable and reproducible position, the engaging member may be engaged with the medium opening and closing mechanism and may be separated from a section to be engaged of the medium attaching and detaching mechanism at a predetermined interval, or an interval between the engaging member and the section to be engaged of the medium attaching and detaching mechanism may be set larger than an interval between the engaging member and a section to be engaged of the cover opening and closing mechanism. As a result, the engagement of the engaging member with the medium attaching and detaching mechanism can be delayed easily.

In addition, the recording and reproducing apparatus may be arranged so that when the case is in the recordable and reproducible position, the engaging member is engaged with the cover opening and closing mechanism and the engaging member is engaged with the medium attaching and detaching mechanism, and when the operating section is operated by an operator, the moving of the cover to the opened position and the ejection of the case are started at the same time according to the moving of the engaging member.

In accordance with the above arrangement, in order to start the movement of the cover to the opened position and the ejecting operation of the case at the same time, slight modification of the arrangement should be possibly considered so that the case, which moves from the recordable and reproducible position to the insertion completing position, does not interfere with the cover. Namely, the arrangement that, for example, the moving speed of the cover to the opened position becomes faster than the moving speed of the case is adopted, or the size of the housing is set slightly larger. However, when the movement of the cover to the opened position and the ejecting operation of the case are started at the same time, the moving stroke of the operating section for moving only the cover to the opened position i s not required. Namely, the moving stroke of the operating section can be small. Moreover, the time required for ejecting the case out of the housing from the recordable and reproducible position can be shortened, and thus the case can be ejected more promptly.

For fuller understanding of the nature and advantages of the invention, should be made to the ensuing detailed description taken in conjunction with the accompanying drawings.

BRIEF DESCRIPTION OF THE DRAWINGS

FIGS. 1($a$) through 1($d$) are partial cross sectional drawing of a cover opening and closing mechanism according to one embodiment of the present invention and explanatory drawings which show an operation of a cover when MD is inserted.

FIG. 2($b$) is a top plan view; and FIG. 2($c$) is a fragmental sectional view taken along line X—X of FIG. 2($b$).

FIG. 4 is a partial cross sectional view which shows an operating range of the cover opening and closing mechanism.

FIGS. 5($a$) through 5($d$) are explanatory drawings which show the cover in an pressed condition by MD in each moving process of FIGS. 1($a$) through 1($d$).

FIG. 7($a$) is an explanatory drawing which shows an insertion completing position of MD; and FIG. 7($b$) is an explanatory drawing which shows a recordable and reproducible position of MD and movement of the cover to a closed position.

FIGS. 8($a$) through 8($d$) are explanatory drawings which show operations of the cover opening and closing mechanism at the time of ejecting MD.

FIG. 9($a$) is an explanatory drawing which shows a moving domain of the cover of the present invention; and FIG. 9($b$) is an explanatory drawing which shows a moving domain of a conventional cover.

FIG. 10 is another partial cross sectional view which shows the operation of the cover opening and closing mechanism when MD is inserted obliquely.

FIG. 11($a$) is an explanatory drawing which shows an insertion starting state of MD, namely, a state that MD is brought into contact with the cover; and FIG. 11($b$) is an explanatory drawing which shows a state of the cover opening and closing mechanism which corresponds with the posture of the cover shown in FIG. 11($a$).

FIG. 12($b$) is an explanatory drawing which shows a state of the cover opening and closing mechanism which corresponds with the posture of the cover shown in FIG. 12($a$).

FIG. 13($b$) is an explanatory drawing which shows a state of the cover opening and closing mechanism which corresponds with the posture of the cover shown in FIG. 13($a$).

FIG. 18(a) is a plan view which schematically shows an inner arrangement of the recording and reproducing apparatus shown in FIG. 17; FIG. 18(b) is a front view; and FIG. 18(c) is a side view.

FIG. 22(a) is a view from the top of the recording and reproducing apparatus which explains that the medium attaching and detaching mechanism is brought into an operation starting state by the first moving stroke of the ejection handle; and FIG. 22(b) is a view from the side of the recording and reproducing apparatus which explains that the first opening movement of the cover is started by the moving stroke of the ejection handle.

FIGS. 24(a) and 24(b) are perspective views which explains a state that the cover is brought into the opened state by the maximum moving stroke of the ejection handle, and that the MD is ejected from the insertion completing position.

FIGS. 26(a) and 26(b) are explanatory drawings for comparison which shows a relationship between a configuration of the opening of a cabinet and easiness of insertion of MD when the configuration of the opening is varied; FIGS. 26(c) and 26(d) are explanatory drawings which show the insertion completing position and the recordable and reproducible position with respect to the opening having the shape of FIG. 26(b).

FIGS. 28(a) and 28(b) are cross sectional views which schematically show the insertion completing positions and the recordable and reproducible positions of the MD in an arrangement of a conventional cover opening and closing mechanism provided to the recording and reproducing apparatus shown in FIG. 27.

FIG. 29(a) is a cross sectional view which schematically shows the recordable and reproducible position of the MD in an arrangement of the conventional opening and closing mechanism provided to the recording and reproducing apparatus shown in FIG. 27; and FIG. 29(b) is a cross sectional view which schematically shows the recordable and reproducible position of the MD in still another arrangement of the conventional cover opening and closing mechanism.

DETAILED DESCRIPTION OF THE PREFERRED EMBODIMENTS

EMBODIMENT 1

The following describes one embodiment of the present invention on reference to the drawings.

In the following explanation, MD as a magneto-optical recording medium, is used in a recording and reproducing apparatus, but any recording media, such as a 3.5-inch FD, a cassette tape and an MO disk, can be used for a cover opening and closing mechanism as long as they are sheathed with a hard cartridge as a case.

Arrangements other than the arrangement of a cover opening and closing mechanism of the above recording and reproducing apparatus, namely, arrangements of a mechanism relating to attachment, recording and reproducing of a recording medium, etc. are the same as the conventional one. The above-mentioned arrangements will be explained as the need arises.

Figure 2A:
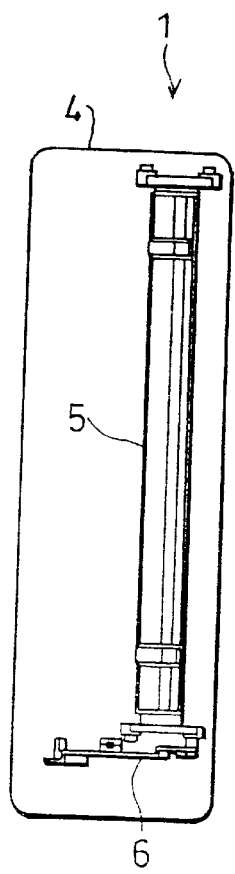
FIG. 2($a$) is a front view which shows an arrangement of the cover opening and closing mechanism in a recording and reproducing apparatus having.
Figure 2B:
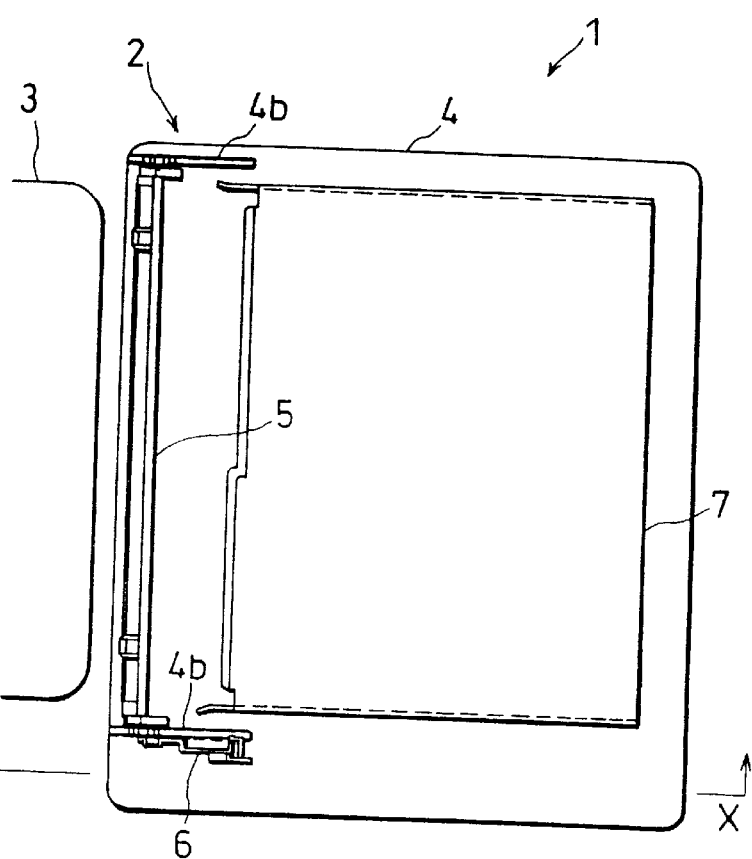
Figure 2C:
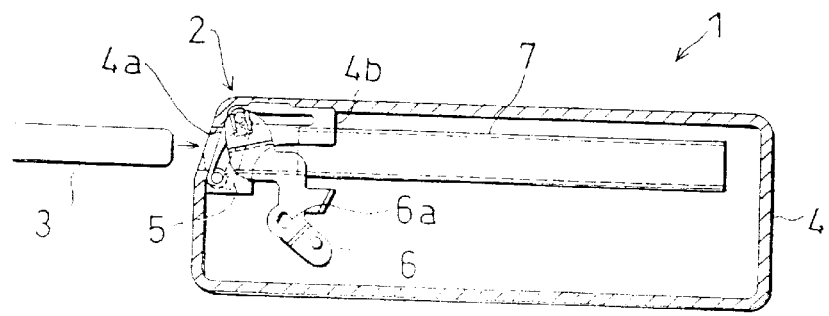

As shown in FIGS. 2(a) through 2(c), a cover opening and closing mechanism 2 of the present embodiment is provided into a recording and reproducing apparatus 1 and is arranged so that cover retaining sections 4b, which supports a cover 5 at its both longitudinal ends movably, are formed in a cabinet 4, and that a cover open/close lever 6 is supported so as to be able to turn round an axis of turning 6a. The cabinet 4 has an opening 4a for inserting an MD 3 therefrom into the apparatus, and the cover open/close lever 6 is connected to the cover 5. The cabinet 4 corresponds to a housing in claim 1 the cover retaining section 4b corresponds to guiding means in claim 1, and the cover open/close lever 6 corresponds to the guiding means in claim 1 and a driving member in claim 12.

Figure 3:
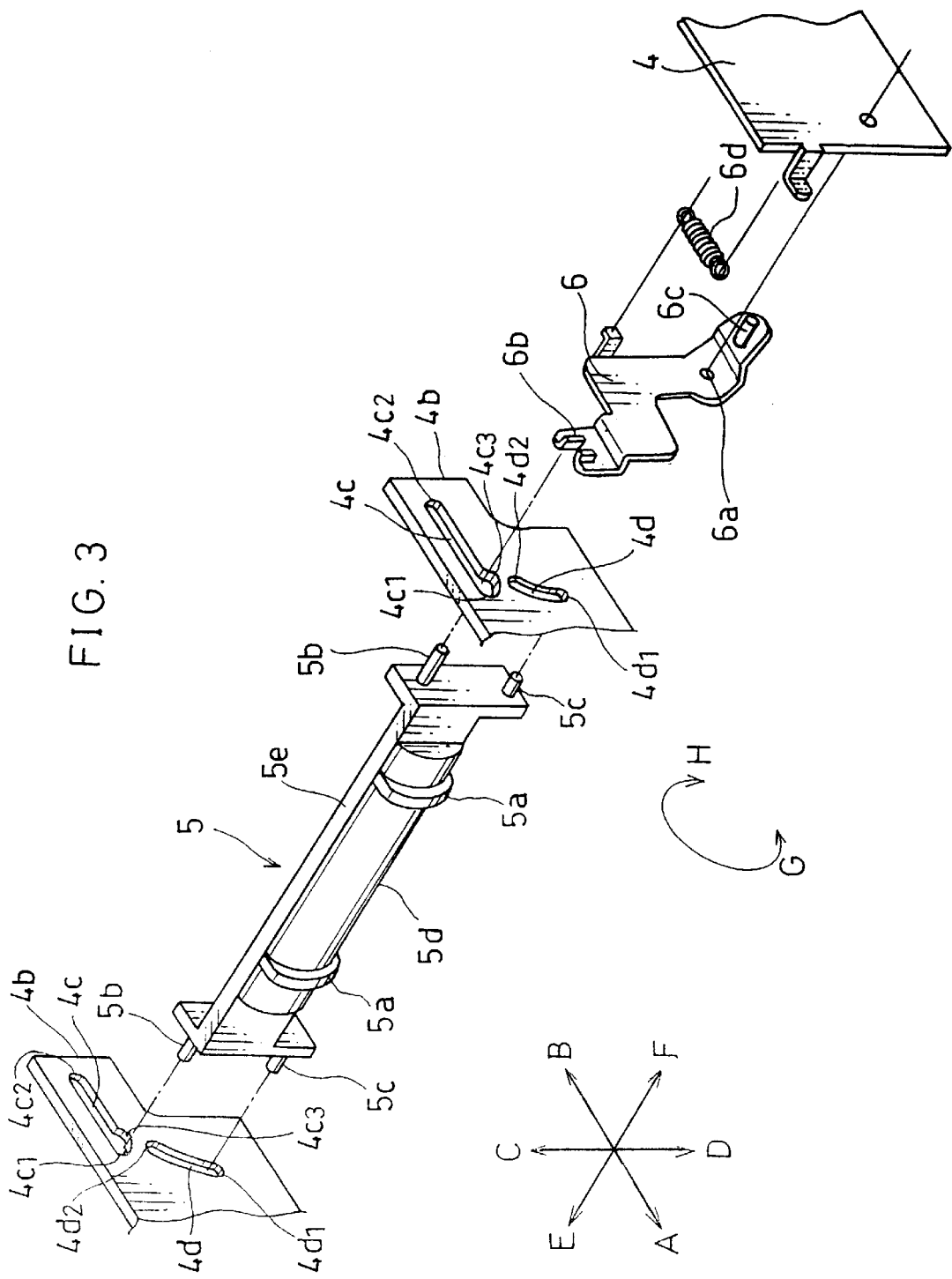
FIG. 3 is an exploded perspective view which shows an arrangement of the cover opening and closing mechanism shown in FIG. 1.

Details of each member composing the cover opening and closing mechanism 2 are described below. However, direction of arrows A through H shown in each drawing such as FIG. 3 are defined as follows. A surface of the recording and reproducing apparatus 1 on which the opening 4a is formed is a front surface, the direction of the arrow A is a front-side direction of the recording and reproducing apparatus 1, the direction of the arrow B is a backside direction of the recording and reproducing apparatus 1, the direction of the arrow C is an upside direction of the recording and reproducing apparatus 1, the direction of the arrow D is a downside direction of the recording and reproducing apparatus 1, the direction of the arrow E is a left-side direction viewed towards the backside direction of the recording and reproducing apparatus 1, the direction of the arrow F is a right-side direction viewed towards the backside direction of the recording and reproducing apparatus 1, the direction of the arrow H is a clockwise direction viewed towards the direction E, namely, an opening direction of the cover 5, and the direction of the arrow G is a counterclockwise direction viewed toward the direction E, namely, a closing direction of the cover S. Moreover, an A-B direction, a C-D direction, and an E-F direction-intersect perpendicularly with one another.

As shown in FIG. 3, convex sections 5a, which are extended upward and downward on the surface in the direction A, i.e. on the front surface and projected in the direction A, are formed along the surface of the cover 5. Moreover, first guide pins 5b and second guide pins 5c, which are projected in the E-F directions from both the ends of the cover 5 in the E-F direction, are formed. Furthermore, the cover 5 has a lower end 5d and an upper end 5e which are parallel with the E-F direction.

Then, first guide grooves 4c, which are substantially parallel with the A-B direction, and second guide grooves 4d are formed respectively in the cover retaining sections 4b. The first guide pin 5b is inserted in the first guide groove 4c so as to be able to slide. The second guide groove 4d is formed in a lower position of a forward end $4c_1$ of the first guide groove 4c so as to have an arc-like shape which is slightly slanted in the direction B with respect to the C-D direction. The second guide pin 5c is inserted in the second guide groove 4d so as to be able to slide. The guide grooves 4c and 4d and guide pins 5b and 5c also compose the guiding means in claim 1.

Meanwhile, as shown in FIG. 7(a), a gap is set between the end in the direction A side on the upper surface of the MD 3 placed in an insertion completing position and an upper inner wall of the cabinet 4 so that the cover 5 can enter and lie down nearly. Namely, the size of the gap is determined based upon a thickness of the cover 5. Moreover, a clearance, which is originally formed between the upper surface of the MD 3 placed in the insertion completing position and the upper inner wall of the cabinet 4, is utilized effectively as the gap.

As a result, as shown in FIGS. 1(a) through 1(d), when the first guide pin 5b is transferred in the A-B direction along the first guide groove 4c, the second guide pin 5c is transferred along the second guide groove 4d. At this time, the cover 5 moves between the opening 4a and the gap so as to draw a substantially arc-like trajectory from the inner surface of the opening 4a along the upper inner wall of the cabinet, and the opening 4a is opened or closed.

In the above movement, when the first guide pin 5b is brought to the forward end $4c_1$, of the first guide groove 4c, and the second guide pin 5c is brought to a lower end $4d_1$, of the second guide groove 4d, as shown by a dotted line in FIG. 4, the cover 5 is brought to a full-closed position. Next, in the full-closed position, when the first guide pin 5b is transferred in the direction B, the cover 5 enters the gap with the upper end 5e (see FIG. 3) first accordingly, the opening 4a is opened. At this time, the cover 5 turns in the direction H relatively round the first guide pin 5b.

As a result, when the first guide pin 5b is brought to a backward end $4c_2$ of the first guide groove 4c, and the second guide pin 5c is brought to an upper end $4d_2$ of the second guide groove 4d, the cover 5 is brought to the full-opened position. On the contrary, in the case where the first guide pin 5b is transferred in the direction A from the backward end $4c_2$, accordingly the cover 5 is turned in the direction G relatively round the first guide pin 5b so as to close the opening 4a, and thus the opening 4a is returned to the full-closed state.

In addition, as shown in FIG. 3, the first guide pin 5b on the side of the direction F penetrates the first guide groove 4c of the cover retaining section 4b, and is engaged with a cover engaging section 6b, which is formed at the upper end of the cover open/close lever 6 so as to have a forked shape. As a result, the cover 5 is connected to the cover open/close lever 6. The relationship between the cover 5 and the cover open/close lever 6 is such that when the first guide pin 5b is moved as mentioned above, accordingly the cover open/close lever 6 turns, and on the contrary, when the cover open/close lever 6 is turned, the first guide pin 5b can be moved as mentioned above.

When the cover 5 and the cover open/close lever 6 move together by means of the first guide pin 5b, as shown in FIG. 4, the first guide pin 5b moves along the first guide groove 4c (see FIG. 3) in the direction B, and at the same time slides the cover engaging section 6b, which turns in the direction H, along from its upper section to its bottom section.

In addition, in the normal state, when a force is applied to the cover open/close lever 6 in the direction G by an elastic member such as a spring 6d, the first guide pin 5b is brought to the forward end $4c_1$, and the opening 4a is retained in the full-closed state by the cover 5. The spring 6d, which corresponds to force applying means in claim 2, is installed across a back of the cover open/close lever 6 and the forward end of the right wall of the cabinet 4, and the spring 6d is expanded and contracted with the spring 6d fixed on the forward end of the right wall.

In addition, a concave section $4c_3$ (FIG. 3) is formed on the lower surface of the first guide groove 4c on the side of the direction A. Namely, a width of the groove is partially widened at the lower surface in the vicinity of the forward end $4c_1$. A depth of the concave section $4c_3$ is determined so that when the first guide pin 5b is brought to the concave section $4c_3$, the second guide pin 5c is brought to the lower end $4d_1$, of the second guide groove 4d. The forward end $4c_1$, the concave section $4c_3$ and the lower end $4d_1$, respectively correspond to a forward end, a concave section and a lower end in claim 10.

The following describes an operation of the cover opening and closing mechanism 2 when the MD 3 is attached based upon the arrangement of the cover opening and closing mechanism 2, FIGS. 1(a) through 1(d), FIGS. 5(a) through 5(d) and FIG. 6.

As shown in FIGS. 1(a) and 5(a), in the full-closed position of the cover 5, when the MD 3 is pressed in the direction B with the head of the MD 3 in the direction B being in contact with the convex sections 5a of the cover 5, the first guide pin 5b moves along the concave section $4c_3$. Namely, the first guide pin 5b slightly turns in the direction H round the second guide pin 5c in the lower end $4d_1$, and the first guide pin 5b reaches the lowest point of the concave section $4c_3$. As a result, the cover 5 is retained in the state that it is slightly slanted to the inward of the cabinet 4 (FIG. 1(b), FIG. 5(b)) compared with the full-closed position of the cover S. In order to compare the full-closed position with the slightly slanted state of the cover 5 easily, the cover 5 which is represented by a solid line and a broken line is shown in FIG. 6.

As a result, compared with the case where the concave section 4c is not formed, since an inclination angle of the cover 5 becomes larger with respect to the C-D direction, the cover 5 easily moves slantingly to the upper side, namely, in a direction where the cover 5 enters the gap by a pressing force applied from the MD 3.

Figure 6:
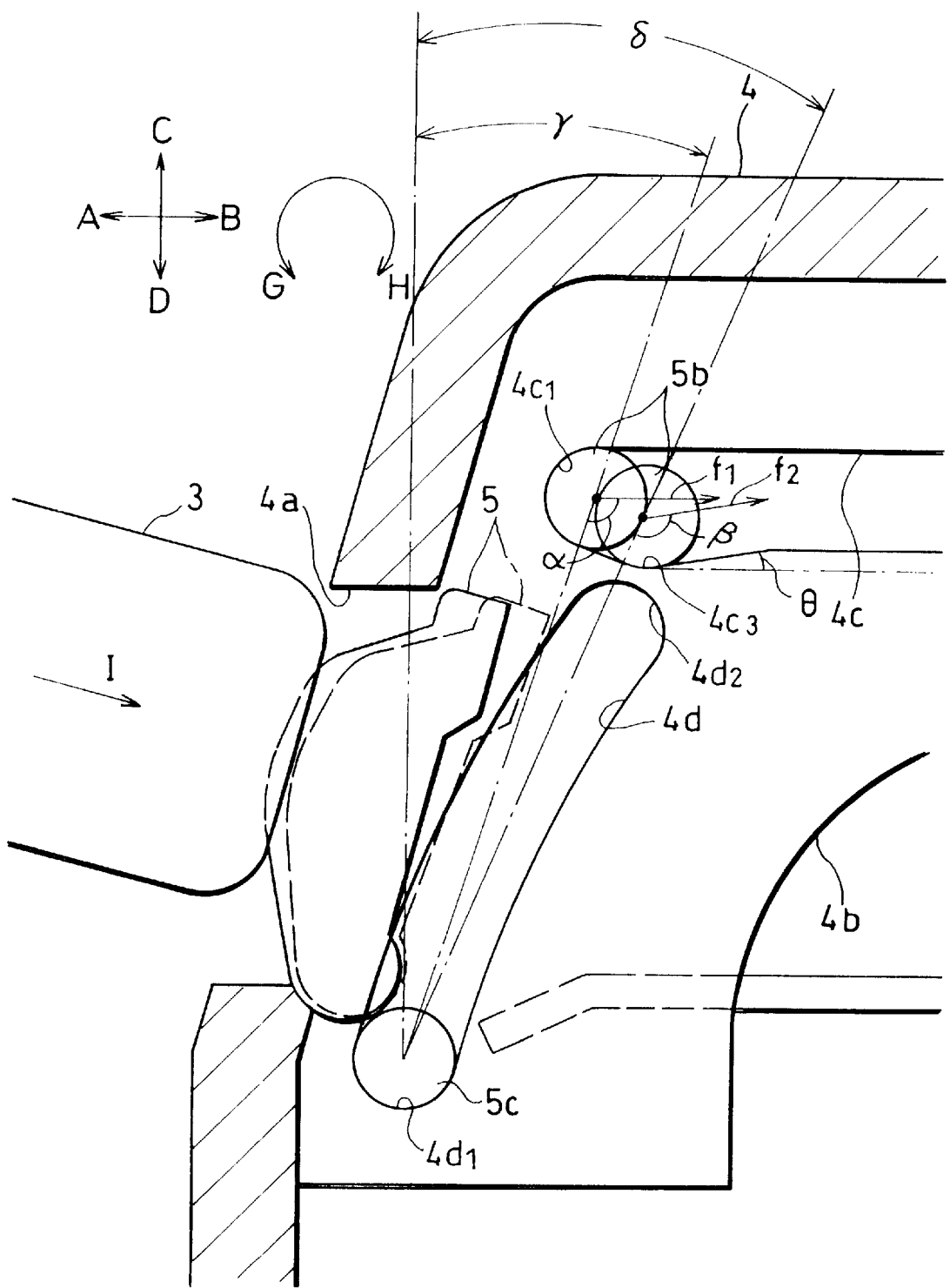
FIG. 6 is a partial cross sectional view which shows an operation of the cover opening and closing mechanism when the MD is inserted obliquely.

The reason for this is described on reference to FIG. 6. First, if the concave section $4c_3$ is not formed in the first guide groove 4c, the first guide pin 5b is made to move in the direction B, which is the longitudinal direction of the first guide groove 4c, by the pressing force, which is applied to the cover 5 from the MD 3. Namely, a component of force $f_1$ which faces the direction B acts upon the first guide pin 5b.

Next, if the concave section $4c_3$ is formed in the first guide groove 4c, since a slope which rises in the direction B from the lowest point of the concave section $4c_3$ is formed, thereafter, the first guide pin 5b which moved to the lowest point of the concave section $4c_3$ is made to move along the slope. Namely, a component of force $f_2$ along the slope acts upon the first guide pin 5b. Since this component of force $f_2$ has a component of force which faces towards the direction C, i.e. an upward component of force, compared with a case where only the component of force $f_1$, which faces the direction B acts upon the first guide pin 5b, the cover 5 more easily moves slantingly to the upper direction, i.e. the direction where the cover 5 enters the gap.

An angle, which is made by the component of force $f_1$ and a straight line drawn through the center of the second guide pin 5c positioned on the lower end $4d_1$ of the second guide groove 4d and the center of the first guide pin 5b positioned on the forward end $4c_1$ of the first guide groove 4c, is set as α, and an angle, which is made by the component of force $f_2$ and a straight line drawn through the center of the second guide pin 5c positioned on the lower end $4d_1$ and the center of the first guide pin 5b positioned at the lowest point of the concave section $4c_3$, is set as β. Moreover, the slope is upwardly slanted to the direction B at an angle θ, and the center of the first guide pin 5b positioned on the forward end $4c_1$ is upwardly slanted at an angle γ with respect to a surface, which is drawn through the center of the second guide pin 5c positioned on the lower end $4d_1$ and is parallel with the C-D direction, and the center of the first guide pin 5b positioned at the lowest point of the concave section $4c_3$ has an angle δ.

In this case, the angle β is represented by the following equation:

$$\beta = \alpha + (\delta - \gamma) + \theta$$

Meanwhile, the reason that the concave section $4c_3$ makes the cover 5 move easily to the direction where the cover 5 enters the gap can be explained as follows on reference to FIG. 10.

First, a straight line, which is drawn from the center of the second guide pin 5c positioned on the lower end $4d_1$ of the second guide groove 4d to the center of a circular arc of the second guide groove 4d, is set as $L_1$, a straight line, which is tangent to the circular arc of the second guide groove 4d at the center of the second guide pin 5c on the lower end $4d_1$, is set as $L_2$, and a straight line, which is drawn from the center of the second guide pin 5c on the lower end $4d_1$ to the direction B, is set as $L_3$. A force, which is applied to the center of the second guide pin 5c on the lower end $4d_1$ by the pressing force of the MD 3 which is inserted towards a direction of arrow I in FIG. 10, is set as $f_I$. Needless to say, the straight line $L_1$ perpendicularly intersects the straight line $L_2$.

In this case, even if the force $f_1$ is applied to the center of the second guide pin 5c between the straight line $L_1$ and the straight line $L_3$, a component of force $f_i$, which pushes up the second guide pin 5c along the second guide groove 4d, is certainly generated. Meanwhile, in the case where a positional relationship, that the straight line $L_2$ is drawn in the vicinity of the center of the first guide pin 5b on the forward end $4c_1$ of the first guide groove 4c, is obtained between the first guide pin 5b and the second guide pin 5c, even if the component of force $f_i$ is generated, the center of the second guide pin 5c cannot have a moment in the direction H due to the component of force $f_i$ with respect to the center of the first guide pin 5b.

However, since the center of the first guide pin 5b moves in the direction B more than the straight line $L_2$ by moving the first guide pin 5b to the convex section $4c_3$, the center of the second guide pin 5c is provided with a moment of the direction H due to the component of force $f_i$ with respect to the center of the first guide pin 5b. As a result, the second guide pin 5c starts to move along the second guide groove 4d due to the generated component of force $f_i$.

As mentioned above, in order to give the moment in the direction H due to the component of force $f_i$ to the center of the second guide pin 5c with respect to the center of the first guide pin 5b at an early time, the center of the first guide pin 5b needs to be moved to an inward part of the straight line $L_2$ quickly. When the concave section $4c_3$ is formed in the first guide groove 4c, as shown in FIG. 10, the center of the first guide pin 5b can be moved to the inward part of the straight line $L_2$ quickly by a pressing force of the MD 3 which is inserted slantingly from the upper direction to the A-B direction.

According to the above explanation, it is clear that a limit for the slant insertion of the MD 3 into the opening 4a is shown by the straight line $L_1$, and if the pressing force having a direction to the direction D from the straight line $L_1$ acts on the second guide pin 5c, then the cover 5 cannot be risen.

As a result, the force for starting to move the cover 5, namely, an initial pressing force when an user inserts the MD 3 can be suppressed weak by forming the concave section $4c_3$ in the proximity of the forward end $4c_1$ of the first guide groove 4c. Moreover, as shown in FIG. 6, even in the case where the MD 3 is slantingly inserted into the opening 4a from the upper direction such as the direction I, the first guide pin 5b moves to the concave section $4c_3$ smoothly. Therefore, the cover 5 can be moved smoothly so that the opening 4a is opened due to the above movement of the first guide pin 5b, thereby making it possible to insert the MD 3 easily.

Next, the MD 3 is further pressed in the direction B with the first guide pin 5b on the concave section $4c_3$, the first guide pin 5b starts to move from the lower point of the concave section $4c_3$ over the slope towards the direction B, and accordingly the second guide pin 5c starts to move along the second guide groove 4d towards the upper end $4d_2$ (FIGS. 1(c), 5(c)). The cover 5 turns and relatively round the first guide pin 5b and at the same times moves to the direction B. Then, as shown in FIGS. 1(d) and 5(d), the turning of the cover 5 according to the moving of the MD 3 is continued until the lower end 5d of the cover 5 comes to the upper surface of the MD 3.

When the lower end 5d of the cover 5 comes to a position which comes into contact with the upper surface of the MD 3, the first guide pin 5b is on the backward end $4c_2$, and the second guide pin 5c is on the upper end $4d_2$ so that the cover 5 is in the full-opened position that the cover 5 lies down. As a result, the turning of the cover 5 is completed. When the pressing force is further applied to the MD 3, while sliding on the lower end 5d of the cover 5, the MD 3 is stored in a disk holder 7. (FIG. 7(a)).

When the MD 3 is stored in the disk holder 7 completely, the disk holder 7 moves from the insertion completing position to the direction D by an MD attaching mechanism, not shown, and as shown in FIG. 7(b), the disk holder 7 is set to a recordable and reproducible position so that the attachment of the MD 3 is completed.

At this time, when the disk holder 7 containing the MD 3 moves to the direction D, accordingly the cover 5 reverses the entering trajectory into the gap, and when the disk holder 7 is set in the recordable and reproducible position, the cover 5 closes the opening 4a.

This, as mentioned above, is performed by the cover open/close lever 6, to which a force is applied by the spring 6d so that the cover open/close lever 6 is turned to the direction G. However, when the MD 3 is in the insertion completing position, the lower end 5d is brought into contact with the upper surface of the MD 3, so the turning of the cover open/close lever 6 connected to the cover 5 to the direction G is obstructed. However, when the disk holder 7 starts to move in the direction D, a retaining power, which is used when the upper surface of the MD 3 supports the lower end 5d so that the turning of the cover open/close lever 6 is obstructed, is released. As a result, since the cover open/close lever 6 turns in the direction G so as to move the first guide pin 5b in the direction A, the second guide pin 5c moves along the second guide groove 4d in the opposite direction to the open-state, namely, the lower direction. When the first guide pin 5b is on the forward end $4c_1$, and the second guide pin 5c is on the lower end $4d_1$, the cover 5 is brought to the full-closed position (FIG. 7(b)).

As mentioned above, not only when the MD 3 is not attached but also when the MD 3 is attached, the opening 4a can be full-closed. Therefore, the cover 5 can prevent dust and foreign matters from entering regardless of the case whether the MD 3 is attached or not.

Next, the following explains the operation of the cover opening and closing mechanism 2 when the MD 3 which is attached into the recording and reproducing apparatus 1 is ejected on reference to FIGS. 8(a) through 8(d).

First, when the MD 3 is attached, as shown in FIG. 8(a), the cover 5 is in the full-closed position. In this state, when ejection operating means, not shown, is operated by an user, a driving protrusion 6c of the cover open/close lever 6 receives an applied force of direction H by means of an ejection mechanism, not shown (mentioned later), so as to start turning in the direction H round the axis of turning 6a in opposition to the applied force of the spring 6d.

As a result, according to the turning of the cover engaging section 6b in the direction H, the first guide pin 5b, which is engaged with the cover engaging section 6b, also moves in the direction B, thereby actuating the cover 5 in the same manner as the case where the cover 5 is pressed in the direction B by the MD 3. Namely, as shown in FIG. 8(b), the cover 5 is brought to the full-opened position.

The disk holder 7 is risen from the recordable and reproducible position with the cover 5 in the full-opened position, and the disk holder 7 is stopped rising in the position where the lower end 5d of the cover 5 is brought into contact with the upper surface of the MD 3. When the disk holder 7 is stopped, the ejection mechanism, not shown, releases the applied force of the cover open/close lever 6 in the direction H, so the lower end 5d of the cover 5 presses the upper surface of the MD 3 so that the full-opened position of the cover 5 is maintained.

In addition, since the ejection mechanism ejects the MD 3 in the direction A, a portion of the MD 3 is protruded outside from the opening 4a (FIG. 8(c)).

When the user grips the MD 3 and ejects it from the opening 4a, the constraint state of the cover 5 due to the upper surface of the MD 3 is released. As a result, the cover 5 completely closes the opening 4a again (FIG. 8(d)) due to the applied force in the direction G, which is applied to the cover open/close lever 6 by the spring 6d.

Namely, when the MD 3 in the recordable and reproducible position is ejected, the cover 5 is brought to the open-position by linkage with the ejecting operation by the user. At the same time, the MD 3 is risen to the insertion completing position so as to be able to be ejected, and when the MD 3 is ejected completely, the cover 5 can be brought to the full-closed position. As to the ejection mechanism and the mechanism which links the attaching mechanism of the MD 3 with the cover 5, detailed explanation will be given later in embodiment 2.

FIGS. 9(a) and 9(b) respectively show a moving domain of the covers 5' and 5 in a cover open close mechanism 2' of a recording and reproducing apparatus 1' having the above-mentioned conventional arrangement and in the cover opening and closing mechanism 2 of the recording and reproducing apparatus 1 having the arrangement of the aforementioned embodiment. The cover opening and closing mechanism 2 and 2' are compared with each other on reference to FIGS. 9(a) and 9(b).

For comparison, in FIGS. 9(a) and 9(b), the layout of the cabinet 4, the cover 5 and the recordable and reproducible position of the MD 3 in the recording and reproducing apparatus 1 according to the present embodiment is also applied to the conventional recording and reproducing apparatus 1'.

First, as shown in FIG. 9(b), in the case of the conventional cover opening and closing mechanism 2' having the cover 5' which turns round an axis, a moving domain N, which is determined by a radius of the turning of the cover 5', overlaps with the MD 3 in the recordable and reproducible position partially. Namely, in the conventional cover opening and closing mechanism 2', when the MD 3 is in the recordable and reproducible position, the upper surface of the MD 3 interferes with the cover 5', and thus the cover 5' is not brought to the closed position but the half-open position. Therefore, in order to bring the cover 5' into the full-closed position at the time of attaching the MD 3, it is necessary to move the recordable and reproducible position to a position where the recordable and reproducible position does not overlap the moving domain N, and thus the cabinet 4 should be enlarged.

Meanwhile, as shown in FIG. 9(a), if the above layout is adopted in the cover opening and closing mechanism 2 of the present invention, a moving domain M of the cover 5 effectively makes use of the space as a clearance, which is inevitably provided between the MD 3 in the insertion completing position and the cabinet 4, and the moving domain M is provided along the upper inner wall of the cabinet 4 from the back side of the opening 4a. For this reason, the moving domain M is smaller than the conventional moving domain N. Moreover, when the MD 3 descends from the insertion completing position to the recordable and reproducible position, a wider space is formed between the cabinet 4 and the MD 3 in the recordable and reproducible position. For this reason, the cover 5 can move so as not to come in contact with the MD 3 in the recordable and reproducible position. Therefore, the cover 5 which moves the moving domain M does not interfere with the MD 3 to be attached, and thus the attached MD 3 does not obstruct the bringing of the cover 5 into the closed position.

As mentioned above, the layout, which is the same as the recording and reproducing apparatus 1' having the conventional cover opening and closing mechanism 2' in which the cover 5' is brought to the half-opened position with the MD 3 attached is adopted in the recording and reproducing apparatus 1 having the cover opening and closing mechanism 2 of the present invention. However, in the recording and reproducing apparatus 1, the cover 5 can be always brought to the closed position regardless of the case whether the MD 3 is attached or not, and thus the recording and reproducing apparatus 1 can be securely protected against the entering of dust and foreign matters.

At the end of the present embodiment, the following explains a configuration of the convex sections 5a formed on the front surface of the cover 5.

FIGS. 11(a) and 11(b) show the cover 5 in the closed position. The state that the cover 5 is slanted in the A-B direction is represented by an inclination angle φ shown in FIG. 11(b). The inclination angle φ is formed by a segment, which connects the center of the first guide pin 5b and the center of the second guide pin 5c, and the A-B direction. Since the inclination angle φ is smaller than 90°, the second guide pin 5c easily rises obliquely along the second guide groove 4d.

In this state, the head of the MD 3 to be inserted in the direction B comes into contact with the convex sections 5a of the cover 5 at a point $Q_0$, and the position of the point $Q_0$ in the A-B direction is determined as an initial position P.

Figure 12:
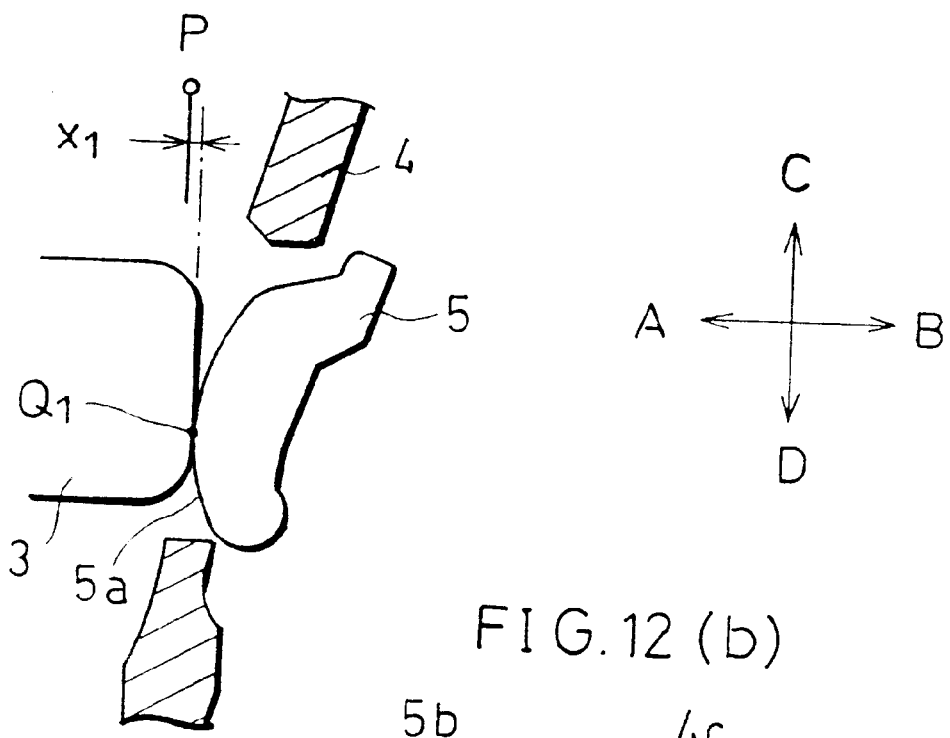
FIG. 12($a$) is an explanatory drawing which shows a displacement amount of a contact point of MD with the cover when the MD is inserted.
Figure 12:
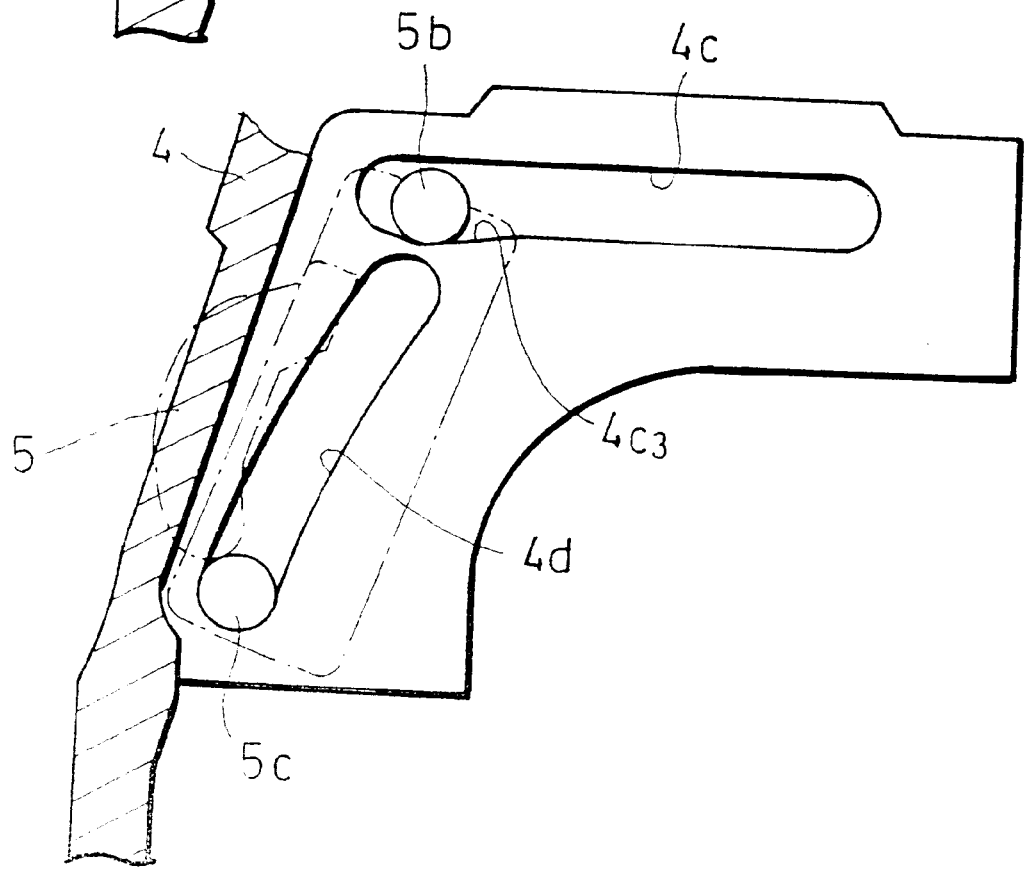

Next, as shown in FIG. 12(a), when the MD 3 is inserted $x_1$ mm in the direction B from the initial position P, as shown in FIG. 12(b), as the first guide pin 5b turns round the second guide pin 5c along the concave section $4c_3$, the cover 5 is slightly slanted to the inward side of the cabinet 4. For this reason, the head of the MD 3 is brought into contact with the convex sections 5a at a point $Q_1$ which is slightly lower than the point $Q_0$ in the direction D. A distance between the point $Q_1$, and the initial position P, namely, a displacement amount of the contact point on a basis of the initial position P is equal with the inserting amount of the MD 3, so it is $x_1$ mm.

Figure 13A:
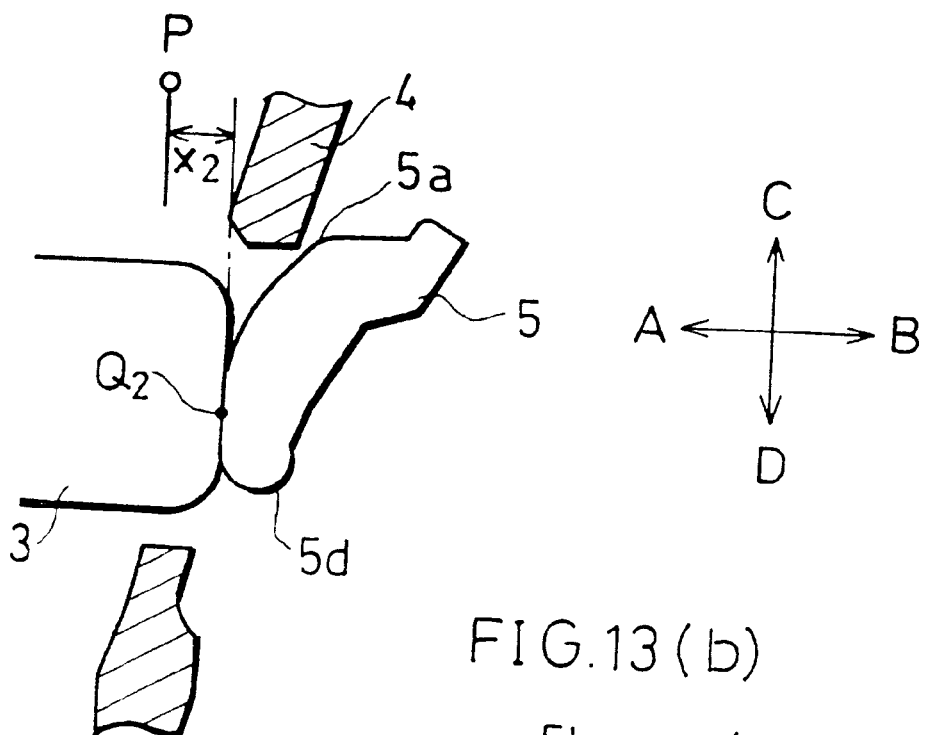
FIG. 13($a$) is an explanatory drawing which shows the displacement amount of the contact point of MD with the cover when the MD is further inserted.
Figure 13B:
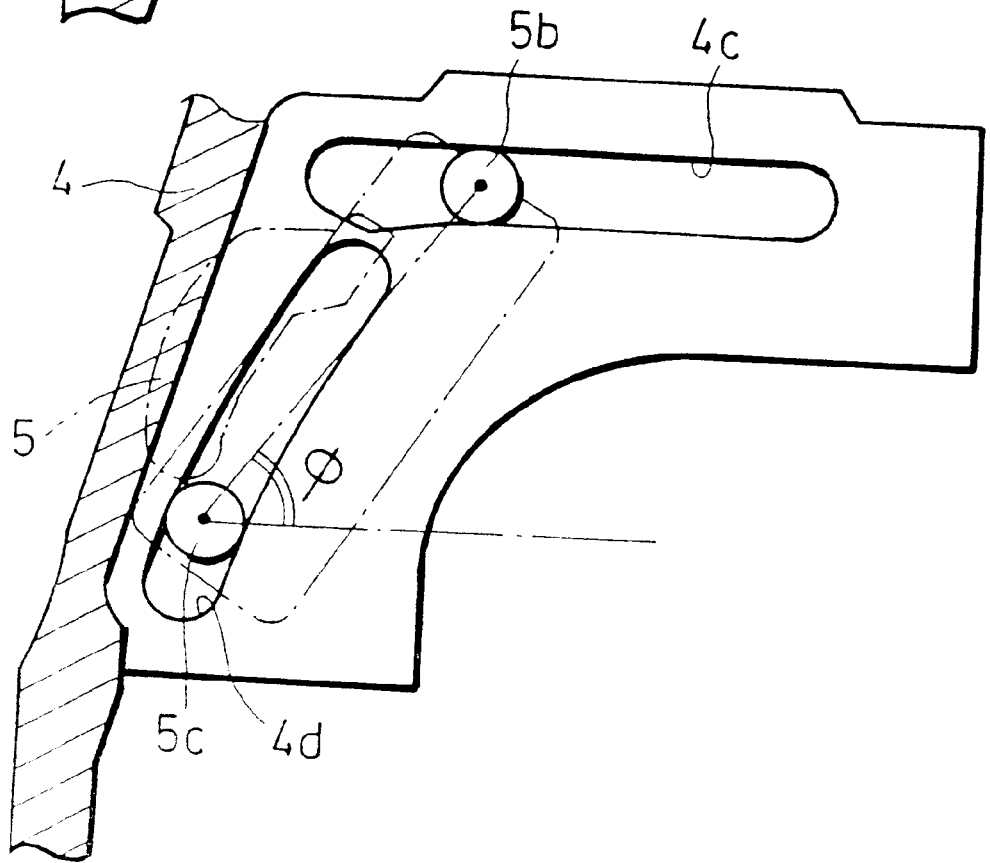
Figure 14:
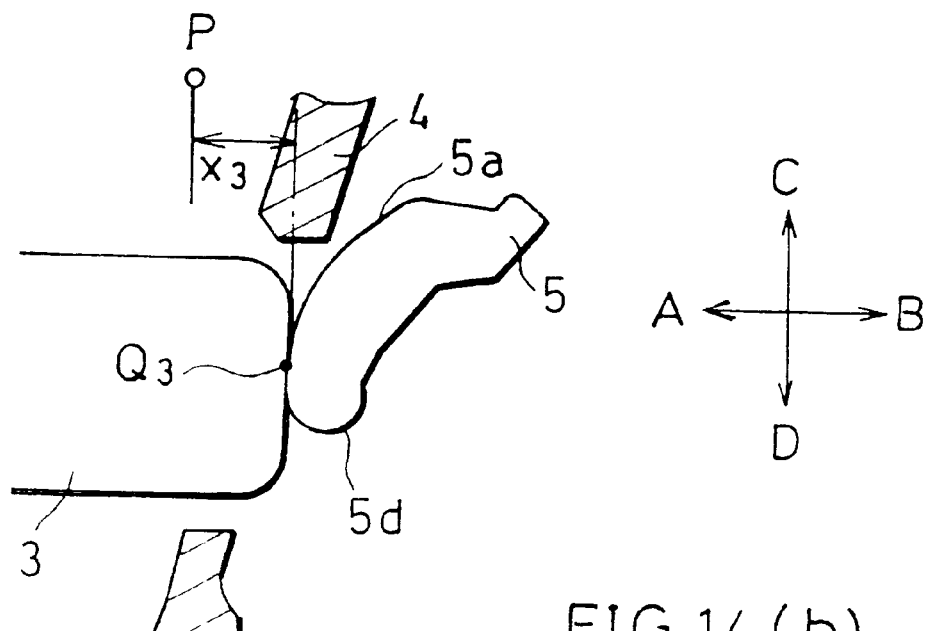
FIG. 14(a) is an explanatory drawing which shows the displacement amount of the contact point of MD with the cover when the MD is further inserted.
FIG. 14(b) is an explanatory drawing which shows a state of the cover opening and closing mechanism which corresponds with the posture of the cover shown in FIG. 14(a).
Figure 14:
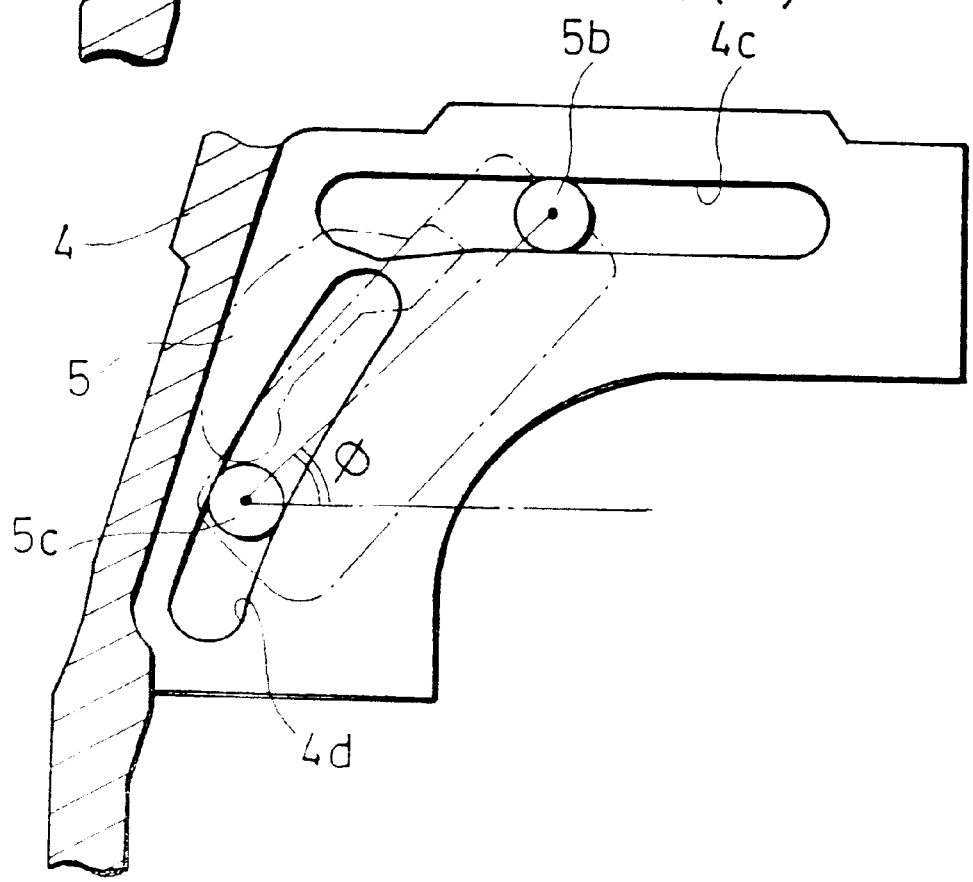
Figure 15:
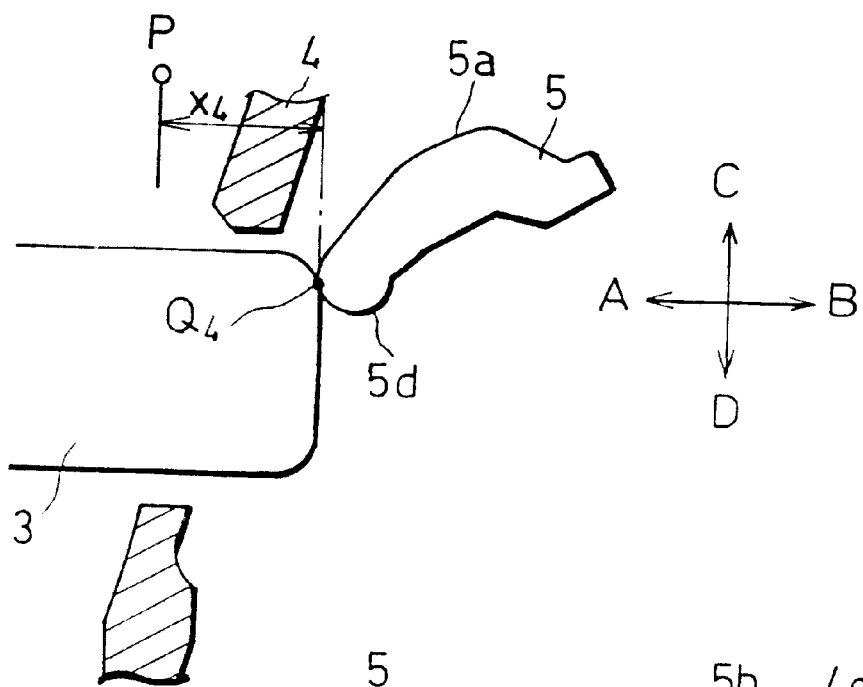
FIG. 15(a) is an explanatory drawing which shows the displacement amount of the contact point of MD with the cover when the MD is further inserted.
FIG. 15(b) is an explanatory drawing which shows a state of the cover opening and closing mechanism which corresponds with the posture of the cover shown in FIG. 15(a).
Figure 15:
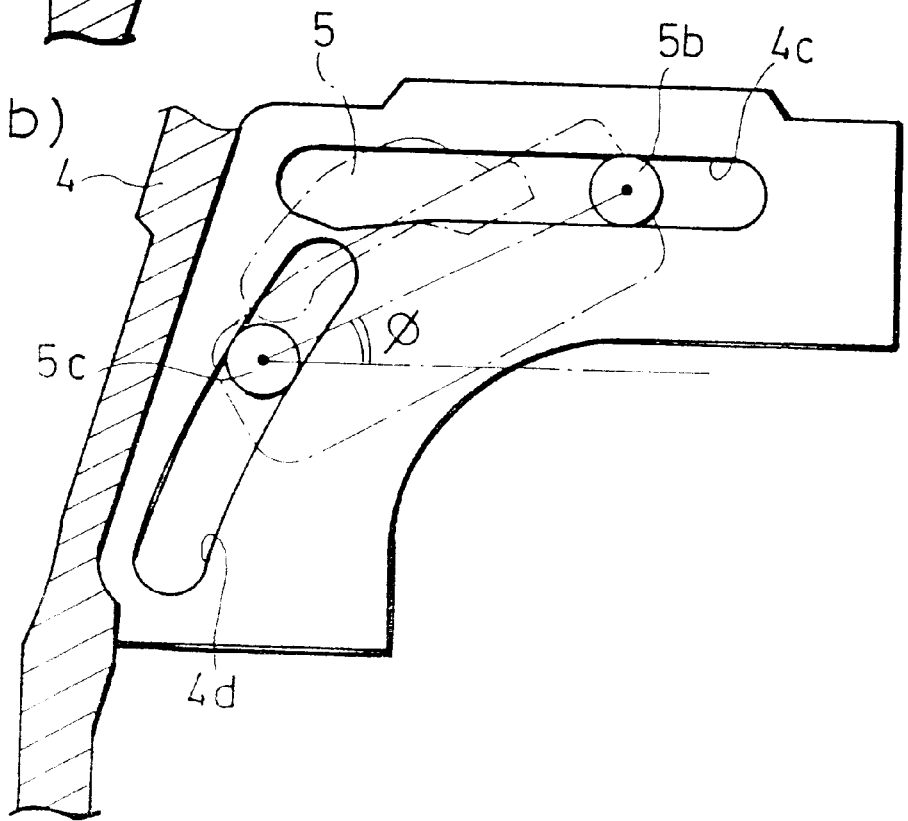

In addition, as shown in FIG. 13(a), when the MD 3 is inserted $x_2$ mm from the initial position P in the direction B, as shown in FIG. 13(b), the first guide pin 5b moves in the direction B along the first guide groove 4c, and as the second guide pin 5c rises along the second guide groove 4d, the inclination angle φ of the cover 5 becomes smaller. Moreover, the head of the MD 3 is brought into contact with the convex sections 5a at a point $Q_2$ which is closer to the lower end 5d of the cover 5 than the point $Q_1$.

As a result, a pressing force, which moves the cover 5 in the direction B, and a partial pressure, which moves the cover 5 along a substantially arc-like moving trajectory for entering the gap provided to the upper section of the cabinet 4, are generated at the point $Q_2$. However, the displacement amount of the point $Q_2$ on a basis of the initial position P is equal with the inserting amount of the MD 3, so it is $x_2$ mm.

Figure 16:
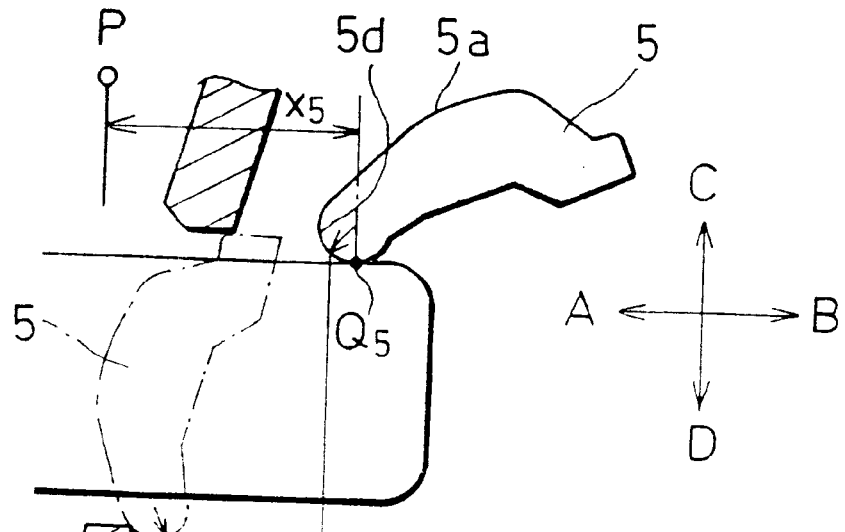
FIG. 16(a) is an explanatory drawing which shows the displacement amount of the contact point of MD with the cover when the cover moves maximumly.
FIG. 16(b) is an explanatory drawing which shows a state of the cover opening and closing mechanism which corresponds with the posture of the cover shown in FIG. 16(a).
Figure 16:
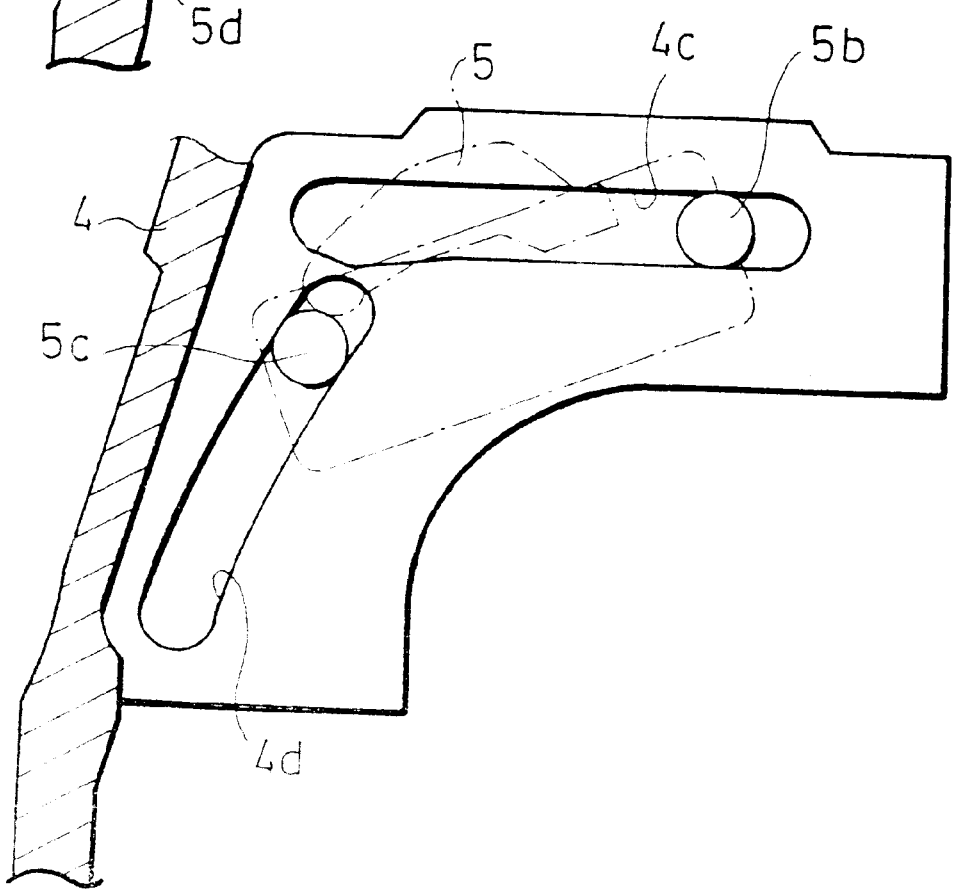

In addition, as shown in FIGS. 14(a) and 14(b) and FIGS. 15(a) and 15(b), when the MD 3 is inserted $X_3$ mm and $x_4$ mm successively from the initial position P in the direction B, the inclination angle φ of the cover 5 becomes smaller gradually, and while the displacement amount of the contact point of the head of the MD 3 with the convex sections 5a is equal with the inserting amount of the MD 3, the contact point reaches closer to the lower end 5d of the cover 5. Then, the state that the displacement amount of the contact point of the head of the MD 3 with the convex sections 5a is equal with the inserting amount of the MD 3 is, as shown in FIGS. 16(a) and 16(b), continued until the cover 5 reaches the maximum height in the direction C, namely, the cover 5 is brought to the full-opened position. The maximum displacement amount of the contact point at this time is $x_5$ mm, but it is found that this value is larger than the displacement amount x' mm (FIG. 16(a)) of a certain point of the lower end 5d of the cover 5 during the period that the cover 5 moves from the closed position to the opened position.

After the cover 5 reaches the maximum height in the direction C, the MD 3 is further inserted in the direction B with the MD 3 always in contact with the lower end 5d of the cover 5 at the point $Q_5$.

As mentioned above, the convex sections 5a are provided with such a configuration that the displacement amount of the contact point of the MD 3 with the convex sections 5a is always equal with the inserting amount of the MD 3 as well as such a configuration that generates a partial pressure for rising the cover 5 along the substantially arc-like moving trajectory for entering the gap when the contact point moves to the lower end 5d of the cover 5. As a result, the moving amount of the cover 5 in the direction B can cope with the large inserting amount of the MD 3.

EMBODIMENT 2

The following describes another embodiment of the present invention on reference to the drawings. Here, for convenience of explanation, those members that have the same arrangement and functions, and that are shown of the aforementioned embodiment 1 are indicated by the same reference numerals and the description thereof is omitted.

The present embodiment explains a mechanism which links the ejection mechanism, which is operated by an operator in order to eject MD attached to the recording and reproducing apparatus, with the cover opening and closing mechanism explained in the embodiment 1.

Figure 17:
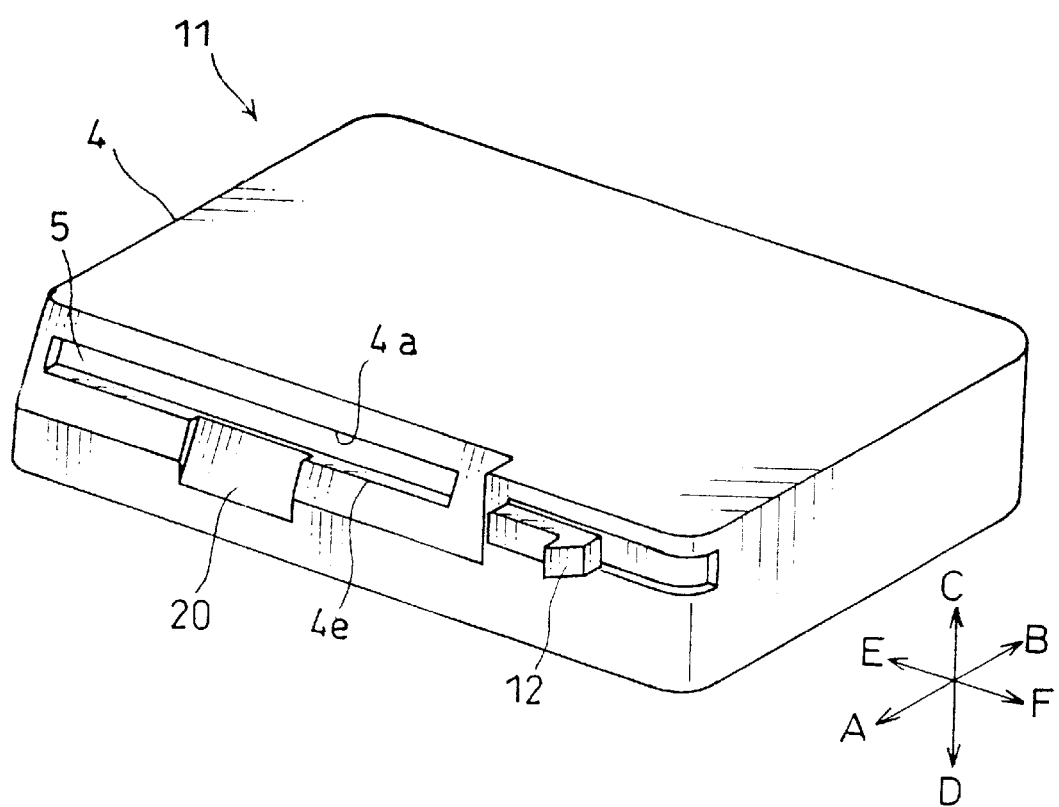
FIG. 17 is a perspective view which shows an appearance of a recording and reproducing apparatus according to an embodiment of the present invention.

First, FIG. 17 shows appearance of a recording and reproducing apparatus 11 according to the present embodiment. The front surface of the cabinet 4 on which the opening 4a is formed is provided with an ejection handle 12 (operating section in claim 5) which is capable of sliding in the E-F direction with the ejection handle 12 being adjacent to the opening 4a. Moreover, a cut section 20 which is a concave section is formed on the lower end 4e of the opening 4a by denting the center portion of the lower end 4e into the cabinet 4.

Next, FIGS. 18(a) through 18(c) shows an inner arrangement of the ejection mechanism. As shown in FIG. 18(a), the ejection handle 12 is linked to an L-shaped turning hook 13 (ejection switch in claim 5), and the turning hook 13 has a turning fulcrum 13a at its bent section so as to turn in a plane which is perpendicular to the C-D direction. An arrow J shown in FIG. 18(a), shows a clockwise turning direction viewed from the side of the direction D, and an arrow K shows a counterclockwise direction. A force is applied to the turning hook 13 by a spring, etc., not shown, so that the turning hook 13 turns in the direction J.

In addition, the turning fulcrum 13a is attached below the turning hook 13, namely, to a frame 14 of the ejection mechanism provided to the side of the direction D. The frame 14 is fixed to the cabinet 4.

Next, a working section 13b which is a turning end of the turning hook 13 is linked to a thin plate-like ejection plate 15 (transmitting means in claim 5). The surface of the ejection plate 15 is perpendicular to the E-F direction, and the ejection plate 15 is attached to the frame 14 so as to be able to slide in the A-B direction. However, a force is applied to the ejection plate 15 by a spring, etc., not shown, so that the ejection plate 15 slides in the direction B. Moreover, its sliding mechanism may be arranged so that, as shown in FIG. 18(c), for example, protrusions 14a are provided to the surface of the frame 14 on which the ejection plate 15 slides, and that the protrusions 14a are fitted in slots 15a, which are formed on the ejection plate 15 correspondingly to the protrusions 14a.

In addition, an engaging section 15b which is lifted in the direction C is formed on an end of the ejection plate 15 in the direction C, and the turning hook 13 is linked to the ejection plate 15 by bringing the engaging section 15b into contact with the working section 13b.

Furthermore, as shown in FIGS. 18(a) through 18(c), the cover open/close lever 6 is supported through the axis of turning 6a at the end on the surface of the frame 14 in the direction A on which the ejection plate 15 slides. As shown in FIG. 18(c), a rod 15c (transmitting means in claim 5 and sliding member in claim 12), which is extended from the ejection plate 15, comes into contact with the driving protrusion 6, which is provided on the opposite turning end to the cover engaging section 6b which is turned by engagement with the first guide pin 5b of the cover 5. The operation of the ejection handle 12 is linked to the opening and closing operation of the cover 5, which is performed by means of the cover opening and closing mechanism, by the arrangement that the rod 15c comes into contact with the driving protrusion 6c.

Next, an MD attaching and detaching mechanism 16 for attaching and detaching the MD 3 inserted from the opening 4a to and from the recordable and reproducible position is provided to the inward of the opening 4a of the cabinet 4. A width of the MD attaching and detaching mechanism 16 in the E-F direction is determined slightly wider so as to correspond to a width of the opening 4a in the E-F direction, and a depth of the MD attaching and detaching mechanism 16 in the A-B direction determined slightly longer corresponding to the length of the MD 3 in the A-B direction.

The MD attaching and detaching mechanism 16 is provided with an operation lever 18 which is able to slide in the A-B direction on a main chassis 17 as a base stand fixed to the cabinet 4. As shown in FIG. 18(b), the operation lever 18 has a box-like shape with three surfaces composed of side surfaces facing each other in the E-F direction and an upper surface, and a width of the upper surface in the E-F direction is determined slightly smaller than a width of the main chassis 17 in the E-F direction.

In addition, an engagement piece 18a which is protruded in the direction F is formed on the side of the operation lever 18 in the direction F. The engagement piece 18a comes into contact with the engaging section 15b, and receives a pressing force which directs from the engaging section 15b to the direction A. Therefore, the operation of the ejection handle 12 and the MD ejecting operation through the MD attaching and detaching mechanism 16 are linked to each other by the engagement of the engaging section 15b of the ejection mechanism with the engagement piece 18a of the MD attaching and detaching mechanism 16.

However, when the engaging section 15b is not pressed by the working section 13b, as shown in FIG. 18(a), a predetermined gap (set to $L_1$ mm) is provided between the engaging section 15b and the engagement piece 18a.

Figure 19:
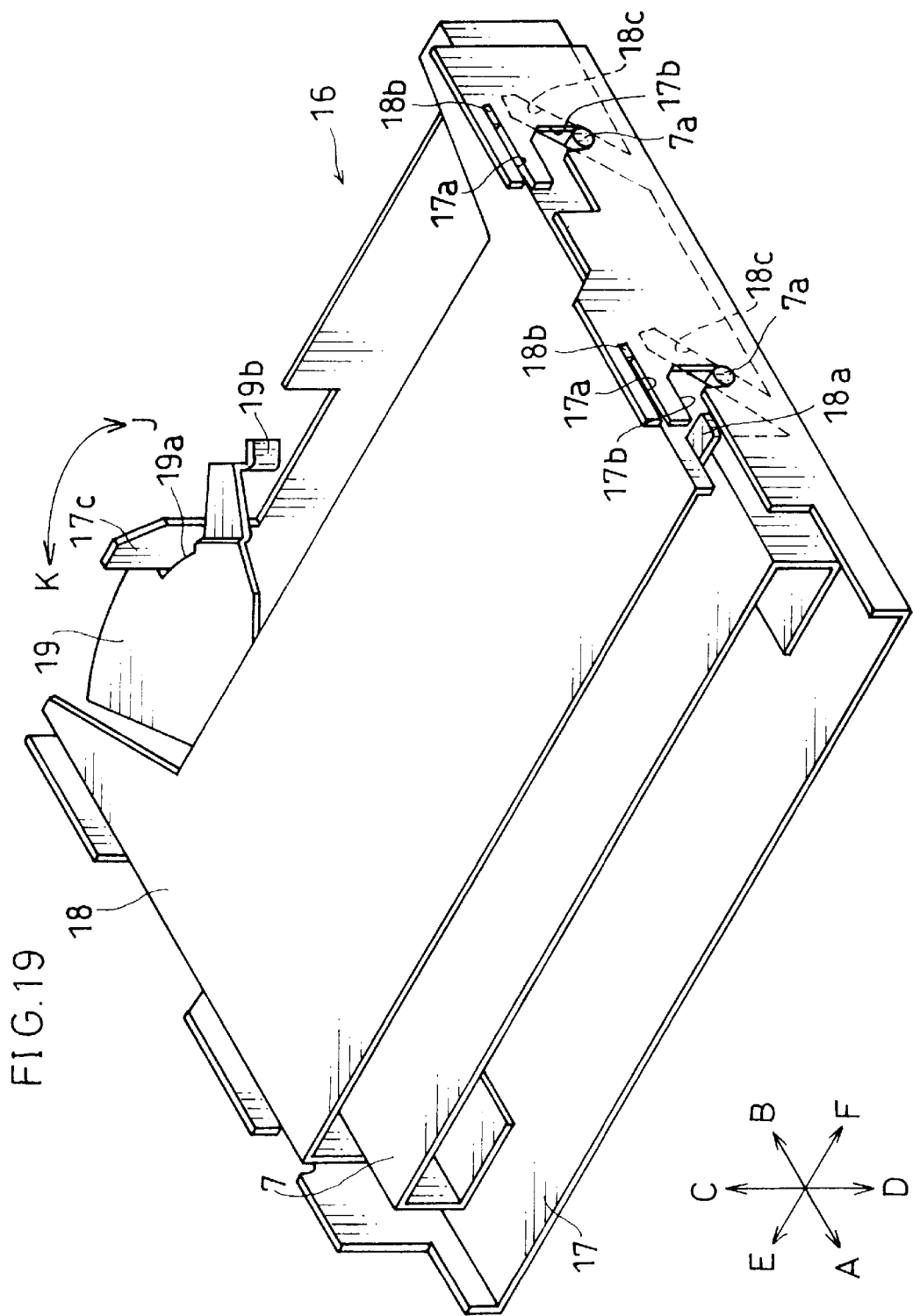
FIG. 19 is a perspective view which shows an arrangement of a medium attaching and detaching mechanism provided to the recording and reproducing apparatus shown in FIG. 17, and a state that a disk holder is provided to a recordable and reproducible position.
Figure 20:
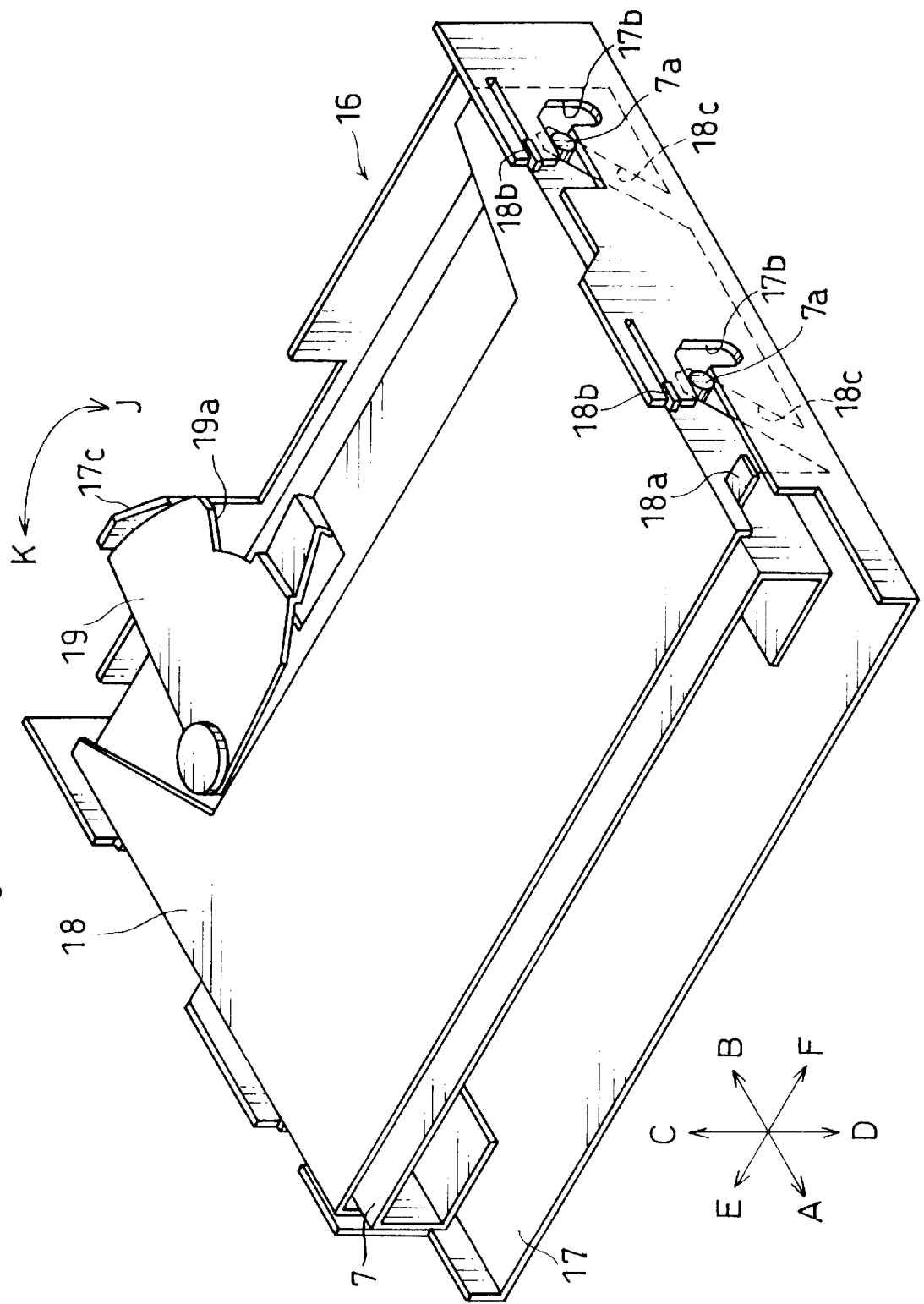
FIG. 20 is a perspective view which shows a state that the medium attaching and detaching mechanism brings the disk holder to an insertion completing position.

Successively, the following explains details of the MD attaching and detaching mechanism 16 on reference to FIGS. 19 and 20.

As shown in FIG. 19, the main chassis 17 has a box-like shape with four surfaces composed of two side surfaces facing each other in the E-F direction, and a back surface in the direction B and a bottom surface. Moreover, the bottom surface of the main chassis 17 and the upper surface of the operation lever 18 face each other, and the side surfaces of the main chassis 17 and the side surfaces of the operation lever 18 face each other closely. A box-like space formed between the bottom surface of the main chassis 17 and the upper face of the operation lever 18 stores the disk holder 7. The disk holder 7 moves up and down in the C-D direction in the box-like space, and the MD 3 is moved between the insertion completing position and the recordable and reproducible position. Moreover, the up and down movement of the disk holder 7 is linked to a horizontal movement in the A-B direction of the operation lever 18. The following details this linkage.

First, a pair of sliding pieces 18b are projected from each side of the operation lever 18 in the A-B direction at a predetermined interval and are fitted in sliding grooves 17a formed in the A-B direction on corresponding each side of the main chassis 17. As a result, the operation lever 18 is supported so as to be able to slide in the A-B direction on the main chassis 17. Moreover, a pair of inclination guiding grooves 18c, which has an acute inclination angle with respect to the direction B, are provided in the A-B direction on each side surface of the operation lever 18. Guide axes 7a, which are protruded parallel from the disk holder 7 in the E-F direction, penetrates in the inclination guiding grooves 18c.

A force is applied to the operation lever 18 by a spring, etc., not shown, so that the operation lever 18 slides in the direction B.

Meanwhile, a pair of L-shaped guide grooves 17b, which are protruded in the direction B and are bent in the direction D, are formed on each side surfaces of the main chassis 17. The guide axes 7a penetrating the inclination guiding grooves 18c are also fitted in the L-shaped guide grooves 17b.

In addition, as shown in FIG. 20, a substantially fan-shaped release lever 19 is attached to the backward upper surface of the disk holder 7 at its axis. A force is applied to the release lever 19 by a spring, etc., not shown, so that the release lever 19 turns in the direction J. Moreover, the arc section of the release lever 19 is partially notched so that a notched concave section 19a is formed. Further, as shown in FIG. 19, a kicking-out section 19b, whose surface is substantially parallel with the C-D direction, is provided to the end on the direction J side of the ends which are formed in a radius direction of the release lever 19 so as to hang from the arc section.

In addition, a stopper 17c is formed on the back surface of the main chassis 17 so that a part of the stopper 17c is extended in the direction C, and as shown in FIG. 19, when the disk holder 7 is in the recordable and reproducible position, the stopper 17c is engaged with the notched concave section 19a. Moreover, as shown in FIG. 20, when the disk holder 7 is in the insertion completing position, the stopper 17 is brought into contact with the arc section of the release lever 19.

In the above arrangement, in the case where the MD 3 is attached to the recordable and reproducible position, the cover 5 which closes the opening 4a is opened only by operating the ejection handle 12 through an operator, and a series of unloading operation for ejecting the MD 3 from the opening 4a is performed as follows.

First, as shown in FIG. 18(b), in the case where the MD 3 is attached to the recordable and reproducible position, the ejection plate 15 and the operation lever 18 slide to the endmost position in the direction B by the applied force. Moreover, the cover 5 is brought to the closed position by the applied force which acts upon the cover open/close lever 6 in the direction G.

In addition, as shown in FIG. 19, the force is applied to the disk holder 7 in the direction B by the operation lever 18 with the disk holder 7 being in the lowest position of the direction D. This is because the applied force having the direction B applied to the operation lever 18 is transmitted to the disk holder 7 by the contact of the inclination guiding groove 18c with the guide axis 7a. However, at this time, the release lever 19 turns in the direction K, and the stopper 17c is engaged with the notched concave section 19a. For this reason, the position of the disk holder 7 in the direction B is regulated by the stopper 17c.

Figure 21:
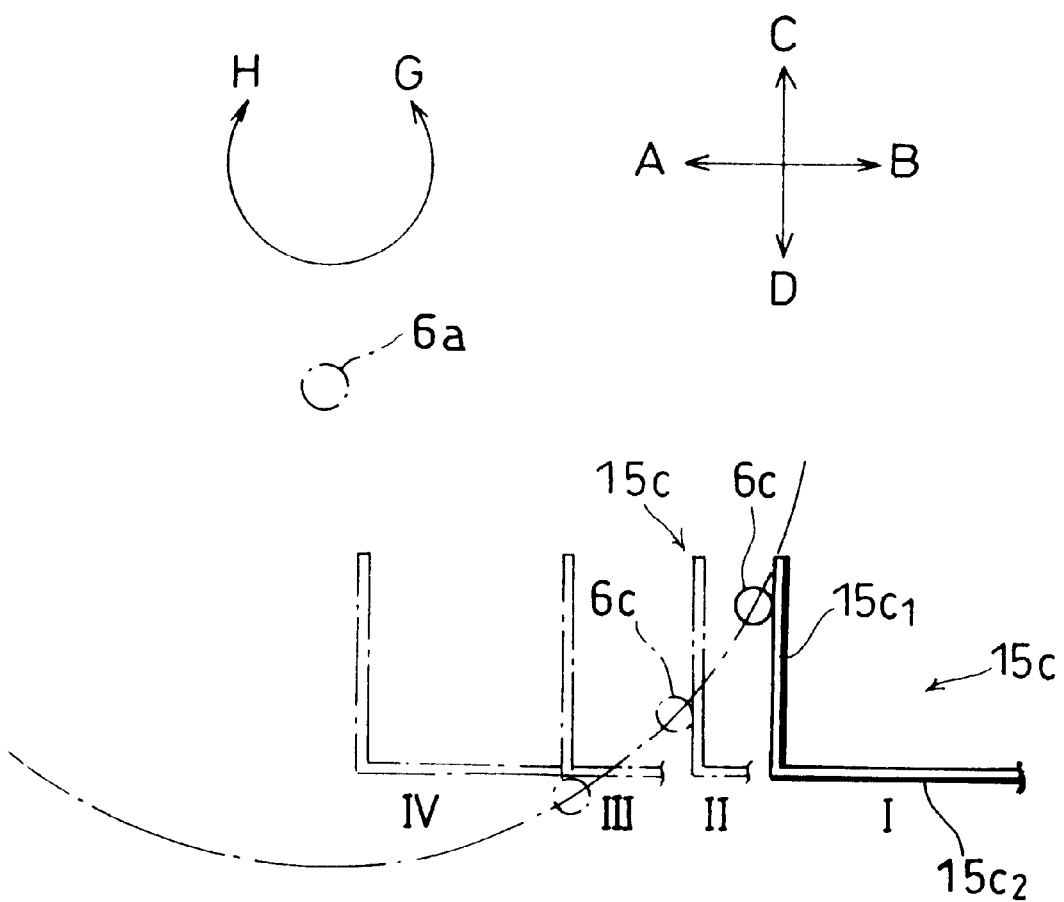
FIG. 21 is an explanatory drawing which shows an operation of a rod for transmitting a moving stroke of an ejection handle to the cover opening and closing mechanism.

The positional relationship between the rod 15c and the driving protrusion 6c is confirmed on reference to FIG. 21. When the MD 3 is attached to the recordable and reproducible position, as shown by a state I, a rising section 15c, (first sliding surface in claim 12) of the rod 15c is brought into contact with the driving protrusion 6c which turns to the endmost position in the direction G.

In this state, as shown in FIG. 22(a), when the operator makes the ejection handle 12 slide in the direction K through an angle $\omega_1$, the turning hook 13 slightly turns in the direction K round the turning fulcrum 13a. As a result, the working section 13b presses the engaging section 15b in the direction A, and thus the ejection plate 15 is linked to the frame 14 so as to slide in the direction A.

At the same time, the rod 15c presses the driving protrusion 6c in the direction A, and the driving protrusion 6c is turned so as to be brought into the state II shown in FIG. 21. As shown in FIG. 22(b), the cover open/close lever 6 turns in the direction H by the turning of the driving protrusion 6c in the direction H, and the cover engaging section 6b moves the first guide pin 5b in the direction B. As a result, the cover 5 is lifted, and thus the opening 4a (FIG. 18(b)) is half opened.

Meanwhile, if a sliding amount of the ejection plate 15 in the direction A at the time of making the ejection handle 12 slide in the direction K through the angle $\omega_1$ is set to $L_1$ mm as mentioned above, the engaging section 15b is exactly comes in contact with the engagement piece 18a of the MD attaching and detaching mechanism 16. Therefore, after the ejection handle 12 is made to slide in the direction K through the angle $\omega_1$, the MD attaching and detaching mechanism 16 starts to be operated so that the MD 3 starts to rise in the direction C from the recordable and reproducible position to the insertion completing position.

In addition, prior to the rise of the MD 3, it is necessary that while the ejection plate 15 is sliding $L_1$ mm in the direction A, the cover 5 exceeds the upper surface of the MD 3 in the recordable and reproducible position (FIG. 22(b)) so that the cover 5 does not interfere with the MD 3. For this reason, it is preferable that the turning radius of the cover engaging section 6b is made larger than the turning radius of the driving protrusion 6c round the axis of turning 6a and that a moving amount of the cover engaging section 6b is larger in opposition to a small sliding amount of $L_1$ mm.

Figure 23B:
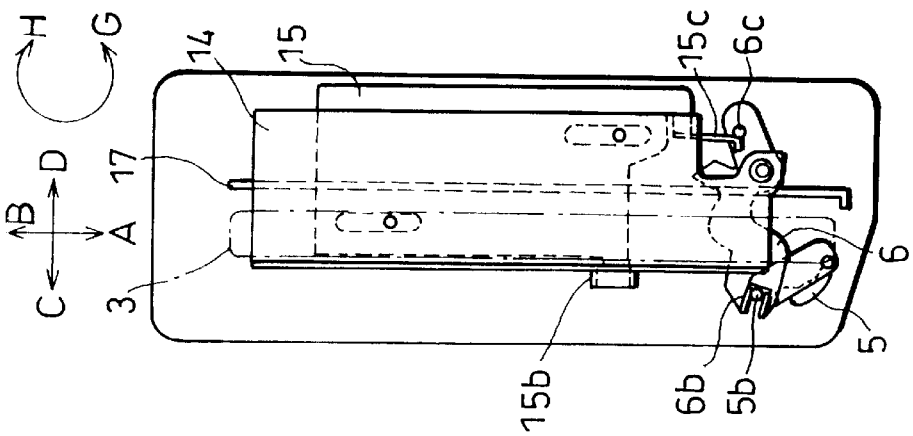
FIGS. 23(a) and 23(b) are views which explain the state that the opening movement of the cover is further progressed by the moving stroke of the ejection handle, and that the MD is risen from the recordable and reproducible position to the insertion completing position.
Figure 23A:
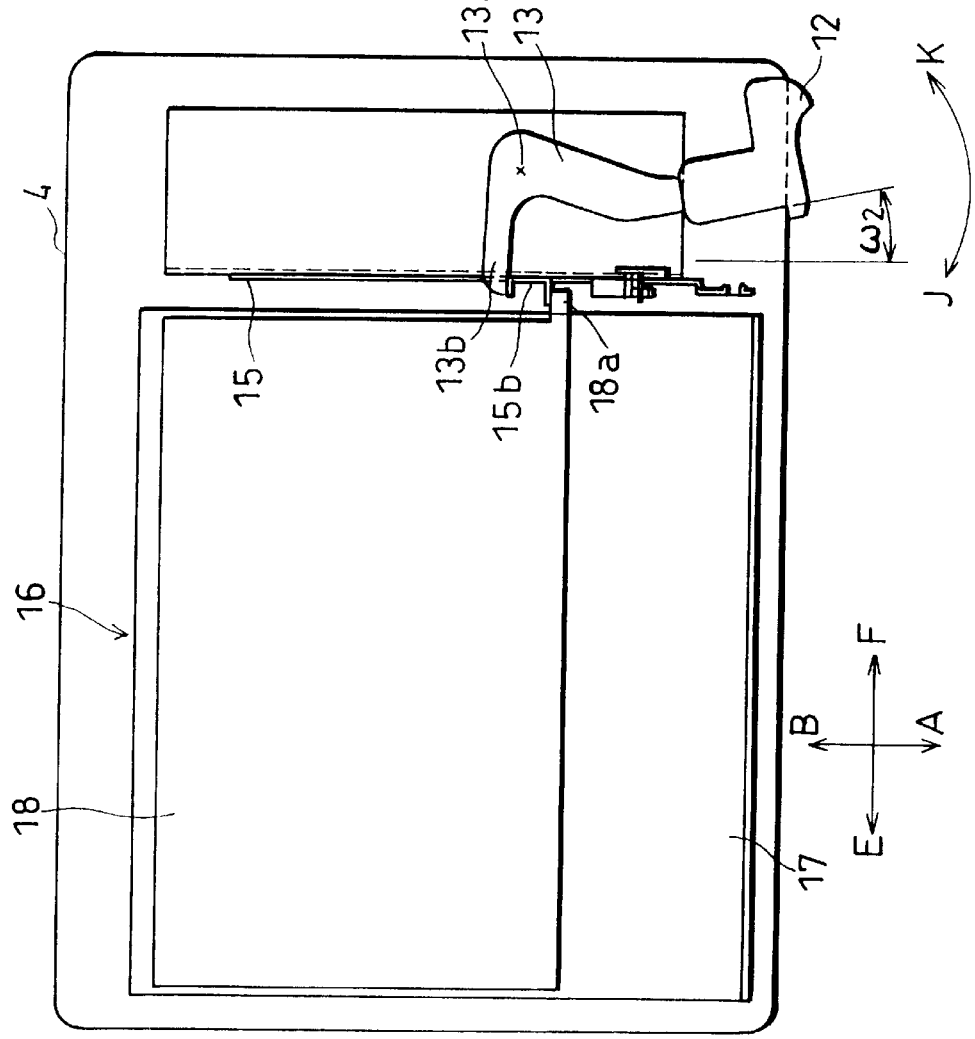

Thereafter, as shown in FIG. 23(a), when the operator makes the ejection handle 12 slide in the direction K through an angle $\omega_2$ (>$\omega_1$), in the same manner as the above, the working section 13b further presses the engaging section 15b in the direction A. As a result, the ejection plate 15 further slides in the direction A on the frame 14.

As a result, at the same time, the rod 15c continues to press the driving protrusion 6c in the direction A, and the driving protrusion 6c is turned so as to be brought into a state III shown in FIG. 21. At this time, the driving protrusion 6c comes in contact with a bending section of the rod 15c on the direction D side, namely, the end of a substantially flat section $15c_2$ which is bent from the rising section $15c_1$ in the direction B (second sliding surface in claim 12) in the direction A. The substantially flat section $15c_2$ has a very small inclination so as to slightly fall in the direction D from the direction B.

When the driving protrusion 6c and the rod 15c have the positional relationship of the state III shown in FIG. 21, as shown in FIG. 23(b), the cover 5 is substantially brought to the full-opened position. Thereafter, the cover 5 is in the full-opened position, and is held in this position. However, as explained later as to the sequential operation of the MD attaching and detaching mechanism 16, in this stage, the MD 3 is not yet ejected and just finishes rising to the vicinity of the insertion completing position. Therefore, the operator should further turn the ejection handle 12 in the direction K so as to eject the MD 3 from the insertion completing position.

As a result, the rod 15c which comes in contact with the driving protrusion 6c further moves in the direction A. At this time, if the rising section $15c_1$ comes in contact with the driving protrusion 6c, the driving protrusion 6c receives further pressing force, and thus the cover engaging section 6b is made to move the first guide pin 5b in the direction B forcibly. As a result, unnecessary load is applied to the cover 5.

However, since the driving protrusion 6c turns from the rising section $15c_1$ to the substantially flat section $15c_2$, only a sliding force of the substantially flat section $15c_2$ is applied to the driving protrusion 6c. In this situation, it is desirable that the sliding force to be applied from the substantially flat section $15c_2$ to the driving protrusion 6c is enough strong to retain the cover 5 in the full-opened position, and thus the very small inclination angle of the substantially flat section $15c_2$ is set accordingly.

In such a manner, as shown in the state IV of FIG. 21, while the rod 15c is further moving in the direction A until the MD 3 is ejected, the driving protrusion 6c slides the substantially flat section $15c_2$.

FIGS. 24(a) and 24(b) correspond to the state IV of FIG. 21, namely, a state that the operator makes the ejection handle 12 slide in the direction K through the maximum angle $\omega_3$. As a result, the working section 13b moves the engaging section 15b in the direction A maximumly, and thus the ejection plate 15 also slides on the frame 14 in the direction A maximumly. At the same time, the MD 3 is ejected by the operation of the MD attaching and detaching mechanism 16, mentioned below.

Figure 25:
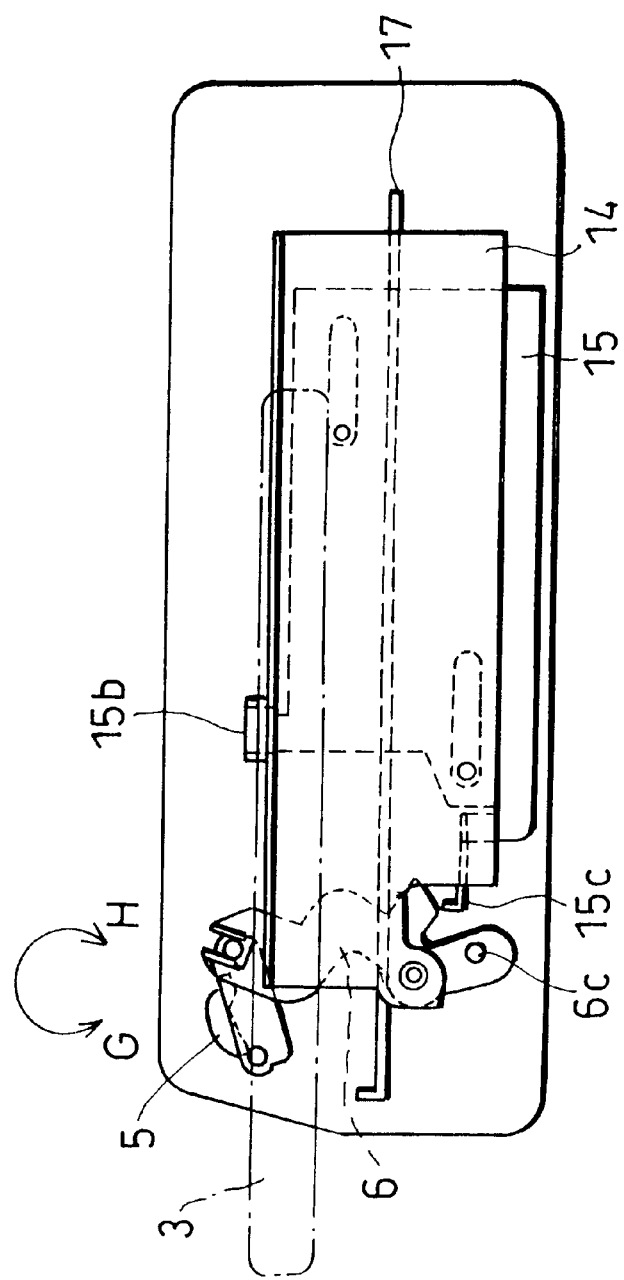
FIG. 25 is a perspective view from the side of the recording and reproducing apparatus which explains a positional relationship between the cover opening and closing mechanism and the rod when the ejection handle is returned to the initial state.
Figure 27:
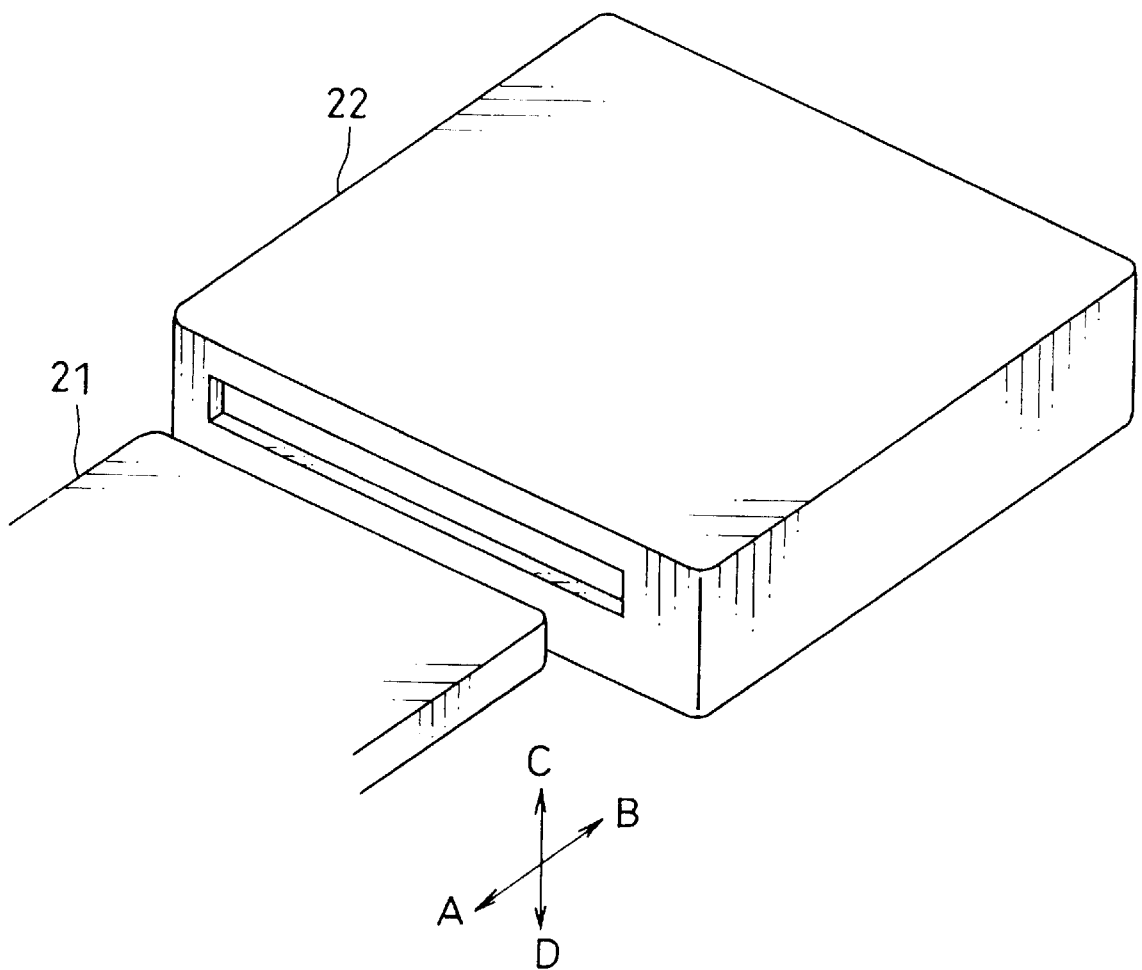
FIG. 27 is a perspective view which shows an appearance of a general recording and reproducing apparatus.

FIG. 25 shows a state that after the operator makes slides the ejection handle 12 in the direction K through the maximum angle $\omega_3$, the operation of the ejection handle 12 is released. At this time, since the turning hook 13 shown in FIG. 24(a) turns in the direction J by the applied force so as to return to the initial state, the engagement of the working section 13b with the engaging section 15 is released. As a result, since the applied force, which returns the operation lever 18 in the direction B, is applied to the engaging section 15b through the engagement piece 18a, as shown in FIG. 25, the ejection plate 15 slides in the direction B so as to be in the initial state.

However, since the cover 5 comes into contact with the upper surface of the ejected MD 3, the cover open/close lever 6 cannot turn the cover 5 to the closed position, and the cover 5 is retained in the state that the cover 5 turns to the endmost position in the direction H. For this reason, the driving protrusion 6c is separated from the rod 15c which moved in the direction B.

Thereafter, when the MD 3 is ejected, the cover open/close lever 6 can turn the cover 5 to the closed position, and as shown in FIG. 18(c), the driving protrusion 6c turns in the direction G so as to return to the state that the driving protrusion 6c comes in contact with the rod 15c.

The explanation on reference to FIGS. 18(a) through 18(c) and FIGS. 24(a) through 24(b) refers to the arrangement that the predetermined gap ($L_1$ mm) is set between the engaging section 15b and the engagement piece 18a as shown in FIG. 18(a), and after the cover 5 moves to the opened position, the MD attaching and detaching mechanism 16 is operated. However, as a turning hook 13' is shown by an alternate long and short dash line in FIG. 22(a), the arrangement may be such that the engaging section 15b is brought into contact with the engagement piece 18a in the state that the ejection handle 12 is not operated, and when the operator operates the ejection handle 12, the motion of the cover 5 to the opened position and the actuation of the MD attaching and detaching mechanism 16 are performed at the same time.

In this case, accuracy of parts and assembly accuracy of the cover opening and closing mechanism 2 and the MD attaching and detaching mechanism 16 might be set strict, and the moving speed of the cover 5 to the opened position might be set faster than the rising speed of the MD 3 in the direction C so that the cover 5 does not interfere with the MD 3. In another way, the thickness of the cabinet 4 in the C-D direction might be slightly enlarged by lowering the recordable and reproducible position in the direction D.

However, the operation for sliding the ejection handle 12 through the angle $\omega_1$, so as to make the engaging section 15b move $L_1$, mm in the direction D is not required and as a result, the moving stroke of the ejection handle 12 can be shortened. Moreover, since the movement of the cover 5 to the opened position and the actuation of the MD attaching and detaching mechanism 16 are started simultaneously, the time required for ejecting the MD 3 is shortened, thereby making it possible to eject the MD 3 more promptly by means of the ejection handle 12 at a short stroke.

The following explains the operation of the MD attaching and detaching mechanism 16 which is linked to the operation of the ejection handle 12.

FIG. 19 shows the state that the MD 3 is in the recordable and reproducible position, and corresponds to FIGS. 18(a) through 18(c). As shown in FIG. 22(a), just when the ejection handle 12 is made to slide in the direction K through the angle $\omega_1$, the engaging section 15b is brought into contact with the engagement piece 18a, and as a result, the sequential operation of the MD attaching and detaching mechanism 16 is started.

First, when the ejection handle 12 is made to slide in the direction K through more than the angle $\omega_1$, the engagement piece 18a in FIG. 19 is pressed in the direction A. As a result, the operation lever 18 moves in the direction A in opposition to the applied force in the direction B. Then, the guide axis 7a of the disk holder 7 receives a component of force having the direction C from the inclination guiding groove 18c. For this reason, the guide axis 7a is guided by the L-shaped guide groove 17b so as to rise in the direction C. At the same time, the guide axis 7a rises along the inclination guiding groove 18c. Namely, the disk holder 7 rises in the direction C directing from the recordable and reproducible position to the insertion completing position.

When a sliding amount of the ejection handle 12 is the angle $\omega_2$, the guide axis 7a reaches the highest point of the L-shaped guide groove 17b. Moreover, as the sliding amount of the ejection handle 12 is increased, the guide axis 7a is pressed in the direction A by the inclination guiding groove 18c so as to move horizontally from the highest point of the L-shaped guide groove 17b to the direction A. Namely, the disk holder 7 comes forward in the direction A.

In such a manner, when the sliding amount of the ejection handle 12 reaches the maximum angle $\omega_3$, the moving amount of the disk holder 7 in the direction A becomes maximum, and thus the engagement of the release lever 19 with the engaging section 17c is released. Since a force is applied to the release lever 19 in the direction J, when the engagement with the engaging section 17c is released, the release lever 19 turns in the direction J. At this time, the kicking-out section 19b is brought into contact with the MD 3 stored in the disk holder 7 at the end of the MD 3 in the direction B, and as shown in FIG. 20, the release lever 19 turns in the direction J so that the MD 3 is ejected in the direction A. As a result, the ejection of the MD 3 is completed.

Finally, the following-describes utility of the cut section 20 (FIG. 17) formed on the front surface of the cabinet 4.

FIGS. 26(b) through 26(d) are partially sectional views which shows a state that the vicinity of the cut section 20 shown in FIG. 17 is cut along a plane which is vertical to the E-F direction. As shown in FIG. 26(b), in the recording and reproducing apparatus 11 of the present embodiment, when the MD 3 is inserted into the opening 4a until the end of the MD 3 on the side in the direction A comes to the upper edge of the opening 4a in the direction C, namely, a position S, as shown in FIG. 26(c), the MD attaching and detaching mechanism 16 further drags the MD 3 into the insertion completing position, and as shown in FIG. 26(d), lowers the MD 3 to the recordable and reproducible position.

Here, the MD attaching and detaching mechanism 16 is brought as close as possible to the cabinet 4 in the direction A, and as shown in FIG. 26(b), a minimum gap is set. Moreover, the thickness of the cabinet 4 is set to a minimum value which is enough for obtaining predetermined strength.

As shown in FIG. 26(a), if the cut section 20 is not formed on the front surface of the cabinet 4, the lower edge of an opening 4a' in the direction D is projected in the direction A more than the position S. For this reason, fingers of the operator, etc. interfere with the lower edge, and it is difficult to insert the MD 3 to the position S.

Therefore, the lower edge, which is projected in the direction A more than the position S, is cut, and the cut section 20 is formed so that the lower edge of the opening 4a in the direction D is dented in the direction B more than the upper edge in the direction C. This makes it easy to insert the MD 3 to the position S.

As mentioned above, when the ejection plate 15 is made to slide by the turning of the turning hook 13 joined to the ejection handle 12, the operation of the ejection handle 12 and the opening and closing operation of the cover opening and closing mechanism are linked to each other, and at the same time the operation of the ejection handle 12 and the unloading operation of the MD attaching and detaching mechanism 16 are linked. As a result, a driving source such as a motor and a transmitting mechanism for the driving force for the opening and closing of the cover 5 and the attaching and detaching of the MD 3, are not required at all.

Therefore, the cover 5 which closes the opening 4a is brought to the opened-position only by the operation of the ejection handle 12 through the operator, and thus the MD 3 can be ejected from the opening 4a. As a result, while the recording and reproducing apparatus 11 is tried to make lightweight and small, the opening 4a is always closed by the cover 5 whether the MD 3 is attached or not so that entering of dust and foreign matters can be prevented sufficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cover opening and closing mechanism for a recording and reproducing apparatus, the recording and reproducing apparatus including a housing having a top surface and a bottom surface, an opening formed in the housing for inserting a case containing a recording medium into the apparatus, a cover for opening and closing the opening being provided in the opening on an inside of the housing, the case inserted into the housing being movable from an insertion completing position to a recordable and reproducible position, and wherein a gap is formed between a top surface of the case in the insertion completing position and an inside top surface of the top surface of the housing, said cover opening and closing mechanism comprising two fulcra for allowing the cover which comes in contact with the case inserted from the opening to enter the gap, an end of the cover closer to the gap substantially following an entering direction of the case by a contact force generated by the insertion of the case, wherein said cover opening and closing mechanism allows said cover to perform a compound motion when entering the gap, said compound motion being the end of the cover moving in a first direction which is directed toward the inside of the housing and a second direction along an upper inner wall of the housing in a substantial arc from a back side of the opening when the cover enters or exits the gap.

2. The cover opening and closing mechanism according to claim 1, further comprising force applying means for reversing the cover to exit the gap and to close the opening when the case is moved from the insertion completing position to the recordable and reproducible position.

3. The cover opening and closing mechanism according to claim 1, further comprising:

first guide pins and second guide pins formed on opposite ends of the cover, extending in a longitudinal direction of the cover; and a pair of cover retaining sections provided in the housing, facing each other, first and second guide grooves formed in said cover retaining sections for respectively guiding the first and second guide pins of the cover, said first and second guide pins fitted in said guide grooves, wherein the first guide grooves are closer to the gap than the second guide grooves, said first guide grooves being formed substantially parallel with the inserting direction of the case, said second guide grooves are formed so that said second guide pins relatively move around said first guide pins when the cover enters the gap.

4. The cover opening and closing mechanism according to claim 3, wherein a width of end portions of said first guide grooves in a vicinity of the opening is greater than end portions of said first guide grooves remote from the opening so that said first guide pins are movable to the inside of the housing further than said second guide pins in said second guide grooves at a start of insertion of the case.

5. The cover opening and closing mechanism according to claim 3, wherein when the opening of the housing is provided on a front section and the gap is provided in an upper section of the housing, a concave section, continuous with a forward end of one of said first guide grooves, is formed on a sliding surface on a lower section of the forward end, and a depth of the concave section is formed so that a distance between the concave section and a lower end of one of said second guide grooves is equal to a distance between said forward end and said lower end.

6. The cover opening and closing mechanism according to claim 3, wherein said second guide grooves are formed in a general shape of an arc having a first end closer to the gap than a second end, and said first end is in a position further from the opening in the direction of insertion of the case than the second end.

7. The cover opening and closing mechanism according to claim 6, wherein said first guide grooves are respectively formed to include a first end closer to the opening and a second end farther from the opening, and when the cover is in the closed position, each one of said first guide pins is on the first end of the first guide grooves and each one of said second guide pins is on the second end of the second guide grooves, and when the cover is in the full-opened position, each one of said first guide pins is on the second end of the first guide grooves and each one of said second guide pins is on the first end of the second guide grooves.

8. The cover opening and closing mechanism according to claim 1, further comprising:

an ejection switch for ejecting the case from the opening out of the housing by means of a moving stroke of an operating section operated by an operator, said operating section being exposed from the housing; and transmitting means for transmitting the moving stroke of the operating section to the cover to allow the cover to enter the gap while retaining the case in the recordable and reproducible position, said moving stroke including a first moving stroke of the operating section from an initial position of the operating section when the case is in the recordable and reproducible position, and a second moving stroke to eject the case from the recordable and reproducible position, said transmitting means holding the cover in the gap during the second moving stroke.

9. The cover opening and closing mechanism according to claim 8, wherein:

said cover opening and closing mechanism move the cover to the opened or closed position, said cover opening and closing mechanism further including a driving member for receiving an energizing force to move the cover to the closed-position, wherein said transmitting means further includes a sliding member movable in contact with the driving member and having a first sliding surface and a second sliding surface, said first sliding surface applying a contact force to said driving member to move the cover to the opened position when the first moving stroke is applied to the operating section, said second sliding surface applying a force to said driving member, substantially balancing with the energizing force applied to said driving member, when the second moving stroke is further applied to the operating section.

10. The cover opening and closing mechanism according to claim 9, wherein a spring member is installed across said driving member and said housing, and when there is no external force applied to the spring member, said cover closes said opening.

11. The cover opening and closing mechanism according to claim 1, wherein the size of said gap is based upon the thickness of the cover, whereby the size of said gap allows the cover to enter said gap uninhibited.

12. The cover opening and closing mechanism according to claim 1, wherein when the case is inserted into the recording and reproducing apparatus from the opening with the case in contact with the cover, a moving amount of a contact point of the case with the cover is equal to an amount that the case is inserted when the cover moves from a full-closed position to a full-opened position, and after the cover is brought to the full-opened position, the moving amount of the contact point is not changed.

13. The cover opening and closing mechanism according to claim 1, wherein the cover includes a convex section for contacting the case to be inserted, said convex section is formed on a surface of the cover which faces an outside of the housing from the opening, and said convex section is formed so that a component of force directed in the moving direction of the cover is changed during movement of the cover form a contact force applied from the case to the convex section according to the amount the case is inserted.

14. The cover opening and closing mechanism according to claim 13, wherein there are two of said convex sections, a first convex section is formed on a part of the surface of the cover, and a second convex section having the same shape as the first convex section is formed on another part of the surface of the cover, the first convex section and the second convex section are formed symmetrically on the surface.

15. A cover opening and closing mechanism for recording and reproducing apparatus, the recording and reproducing apparatus including a housing having an opening formed therein for inserting a case containing a recording medium into the apparatus, a cover for opening and closing the opening being provided in the opening on an inside of the housing, the case inserted into the housing being movable from an insertion completing position to a recordable and reproducible position, said cover opening and closing mechanism comprising:

two fulcra for allowing the cover which comes in contact with the case inserted from the opening to move toward the inside of the housing by a contact force generated by the insertion of the case;

an ejection system including an operating section provided so as to be exposed from the housing, and transmitting means for transmitting first and second moving strokes to the cover so that, when the case is in the recordable and reproducible position, in response to the first moving stroke which an operator gives to the operating section positioned at an initial position, the cover moves toward the inside of the housing, and in response to the second moving stroke which the operator gives to the operating section subsequently to the first moving stroke, the case is ejected from the housing through the opening with the cover remaining inside the housing.

16. A cover opening and closing mechanism for a recording and reproducing apparatus, the recording and reproducing apparatus including a housing having a top surface and a bottom surface, an opening formed in the housing for inserting a case containing a recording medium into the apparatus, a cover for opening and closing the opening being provided in the opening on an inside of the housing, the case inserted into the housing being movable from an insertion completing position to a recordable and reproducible position, and wherein a gap is formed between a top surface of the case in the insertion completing position and an inside top surface of the top surface of the housing, said cover opening and closing mechanism comprising two fulcra for allowing the cover which comes in contact with the case inserted from the opening to enter the gap, an end of the cover closer to the gap substantially following an entering direction of the case by a contact force generated by the insertion of the case, wherein as the case is inserted into the apparatus, said cover opening and closing mechanism allows said cover to perform a compound motion when entering the gap, said compound motion being the end of the cover moving in a first direction which is directed toward the inside of the housing and a second direction along an upper inner wall of the housing in a substantial arc from a back side of the opening when the cover enters or exits the gap.

* * * * *

UNITED STATES PATENT AND TRADEMARK OFFICE
CERTIFICATE OF CORRECTION

PATENT NO. : 6,122,140                                       Page 1 of 1
DATED : September 19, 2000
INVENTOR(S) : Yoshio Sato It is certified that error appears in the above-identified patent and that said Letters Patent is hereby corrected as shown below:

Please insert section [62] as follows:

--[62] Related U.S. Application Data: This is a continued prosecution application (CPA) of Serial No. ) 08/764,260 filed December 12, 1996.--

Signed and Sealed this

Twenty-sixth Day of June, 2001

Attest:

NICHOLAS P. GODICI
*Attesting Officer*      *Acting Director of the United States Patent and Trademark Office*